United States Patent
Dole

(10) Patent No.: US 11,110,503 B2
(45) Date of Patent: Sep. 7, 2021

(54) ROLLER SET AND PIPE ELEMENTS

(71) Applicant: Victaulic Company, Easton, PA (US)

(72) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 217 days.

(21) Appl. No.: 16/276,055

(22) Filed: Feb. 14, 2019

(65) Prior Publication Data

US 2019/0176202 A1 Jun. 13, 2019

Related U.S. Application Data

(62) Division of application No. 14/512,580, filed on Oct. 13, 2014, now Pat. No. 10,245,631.

(51) Int. Cl.
*B21D 17/04* (2006.01)
*F16L 17/04* (2006.01)

(52) U.S. Cl.
CPC .............. *B21D 17/04* (2013.01); *F16L 17/04* (2013.01)

(58) Field of Classification Search
CPC ........ B21D 15/02; B21D 17/00; B21D 17/04; B21D 41/00; B21D 41/203; B21D 41/023; B21H 1/22; F16L 17/04
See application file for complete search history.

(56) References Cited

U.S. PATENT DOCUMENTS

| | | | |
|---|---|---|---|
| 1,463,073 A | 7/1923 | Felten | |
| 1,573,448 A | 2/1926 | Purnell | |
| 2,809,687 A | 10/1957 | Ogle | |
| 3,029,667 A | 4/1963 | Sporck | |
| 3,217,529 A | 11/1965 | Malmede | |
| 3,381,353 A | 5/1968 | Lemmerz | |
| 3,995,466 A | 12/1976 | Kunsman | |
| 4,091,648 A | 5/1978 | McCaslin | |
| 4,143,535 A | 3/1979 | Bouman | |
| 4,557,126 A | 12/1985 | Niino et al. | |
| 5,279,143 A | 1/1994 | Dole | |
| 5,450,738 A * | 9/1995 | Chatterley | B21D 41/02 72/106 |
| 5,564,253 A | 10/1996 | Nakaya | |
| 5,570,603 A * | 11/1996 | Chatterley | B21D 41/02 72/101 |
| 5,727,411 A | 3/1998 | Sakakibara et al. | |
| 5,857,369 A | 1/1999 | Fang | |

(Continued)

FOREIGN PATENT DOCUMENTS

| | | |
|---|---|---|
| DE | 3824856 | 1/1990 |
| EP | 1038603 A2 | 9/2000 |

(Continued)

OTHER PUBLICATIONS

Translation; JP 58-212817 A; Isuzu, Oct. 12, 1983.*

*Primary Examiner* — Edward T Tolan
(74) *Attorney, Agent, or Firm* — Ballard Spahr LLP

(57) ABSTRACT

A roller set for roll forming pipe elements has an outer roller that engages the pipe element at three points to prevent teetering of the pipe element. Inner and outer rollers cooperate to form pipe elements having a projection engageable by keys of mechanical couplings, the projection extending beyond the outer surface of the pipe element and increasing the pressure and bending performance of the combination pipe elements and coupling.

17 Claims, 18 Drawing Sheets

(56) References Cited

U.S. PATENT DOCUMENTS

| | | |
|---|---|---|
| 6,038,758 A | 3/2000 | Kanai |
| 6,196,039 B1 | 3/2001 | Williams et al. |
| 6,240,761 B1 | 6/2001 | Suzuki et al. |
| 6,244,088 B1 | 6/2001 | Compton |
| 6,431,609 B1 | 8/2002 | Andersson |
| 6,473,981 B2 | 11/2002 | Dole |
| 6,598,285 B1 | 7/2003 | Binggeli et al. |
| 6,918,278 B2 | 7/2005 | Dole et al. |
| 6,935,152 B2 | 8/2005 | Dole et al. |
| 7,174,761 B2 | 2/2007 | Iwamoto et al. |
| 8,215,211 B2 | 7/2012 | Akiyama et al. |
| 8,550,502 B2 | 8/2013 | Vandal et al. |
| 9,333,543 B2 | 5/2016 | Dole |
| 10,245,631 B2 * | 4/2019 | Dole ............. B21D 17/04 |
| 2002/0007514 A1 | 1/2002 | Dole et al. |
| 2002/0112359 A1 | 8/2002 | Dole |
| 2005/0212296 A1 | 9/2005 | Dole |
| 2009/0059206 A1 | 3/2009 | Churchill et al. |
| 2013/0055780 A1 | 3/2013 | Novitsky |
| 2015/0040632 A1 | 2/2015 | Puzio |
| 2016/0059287 A1 | 3/2016 | DiPierdomenico |
| 2016/0059293 A1 | 3/2016 | Olesinska |

FOREIGN PATENT DOCUMENTS

| | | |
|---|---|---|
| EP | 2759354 | 7/2014 |
| JP | 58110106 | 6/1983 |
| JP | 58196110 | 11/1983 |
| JP | 58196111 | 11/1983 |
| JP | S58-212817 A | 12/1983 |
| JP | 59104208 | 6/1984 |
| JP | 6475135 | 3/1989 |
| JP | H03-004315 U | 1/1991 |
| JP | H07-100545 A | 4/1995 |
| JP | 09201625 | 8/1997 |
| JP | 2001-353532 A | 12/2001 |
| JP | 2013-103237 A | 5/2013 |
| TW | 359735 B | 6/1999 |

* cited by examiner

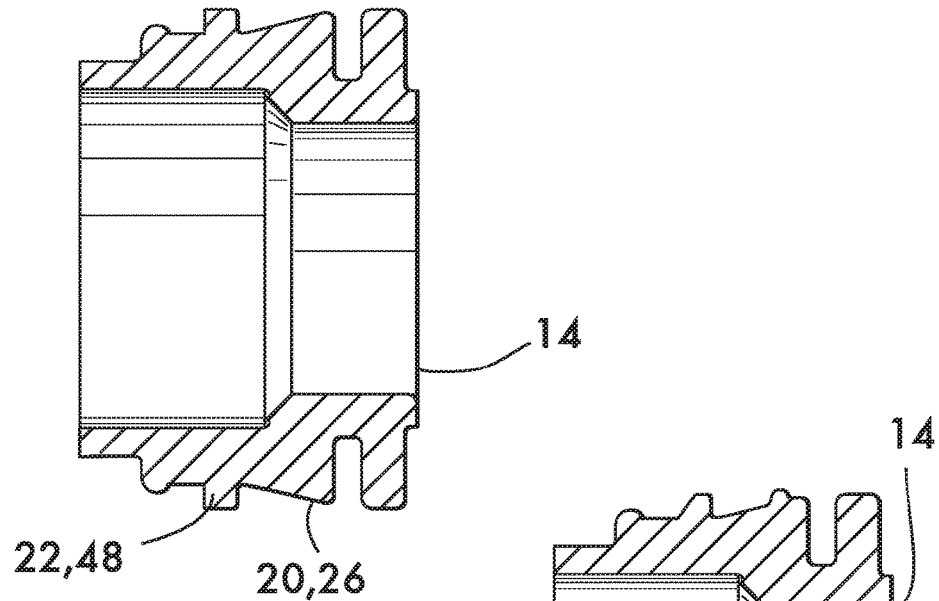
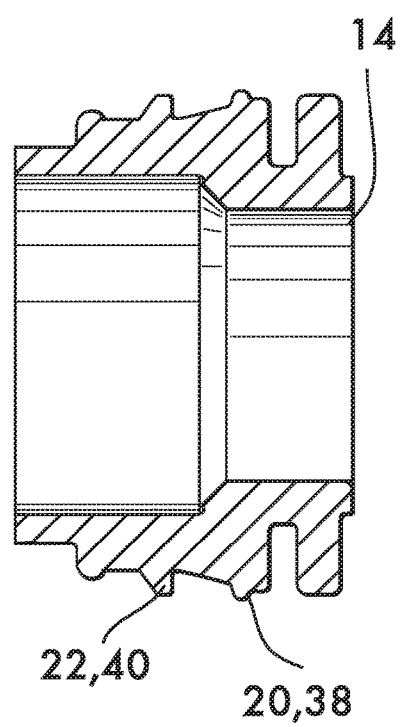
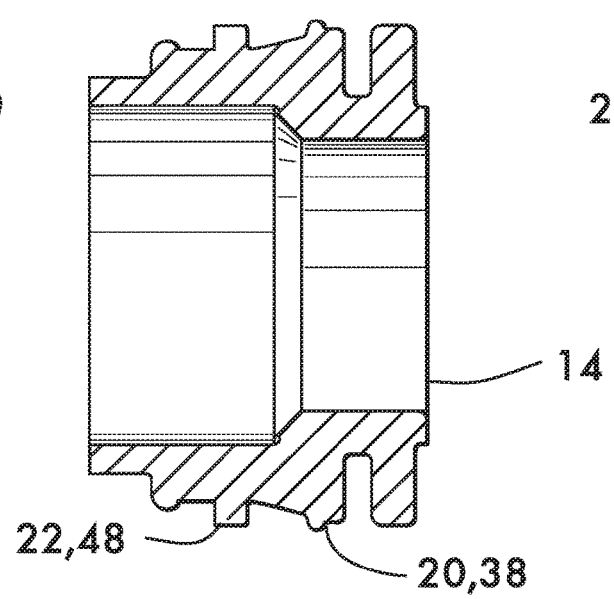

FIG. IE
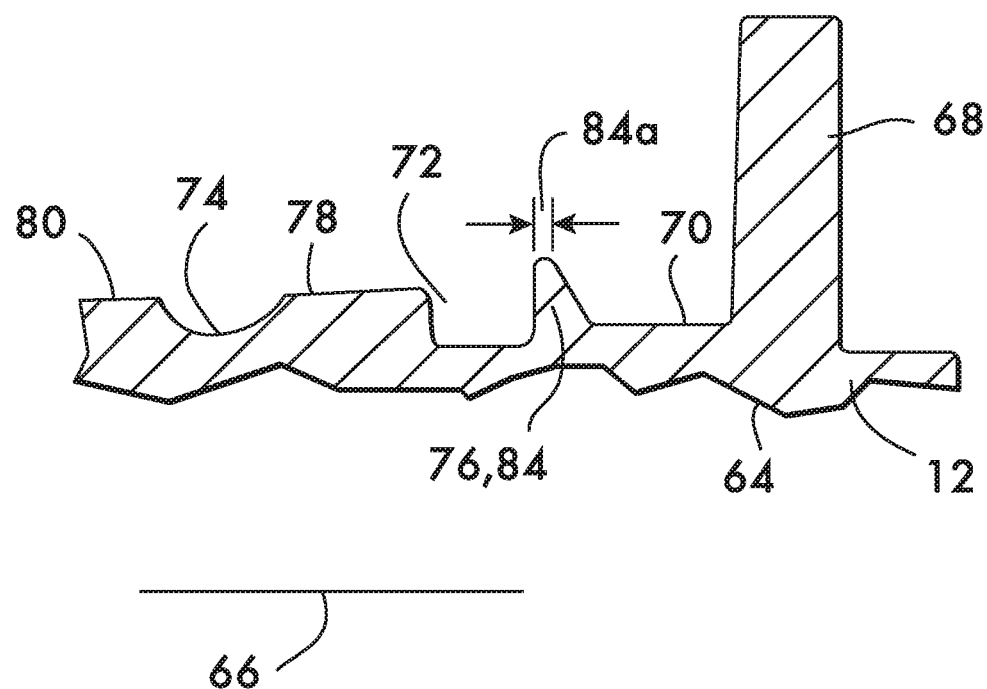

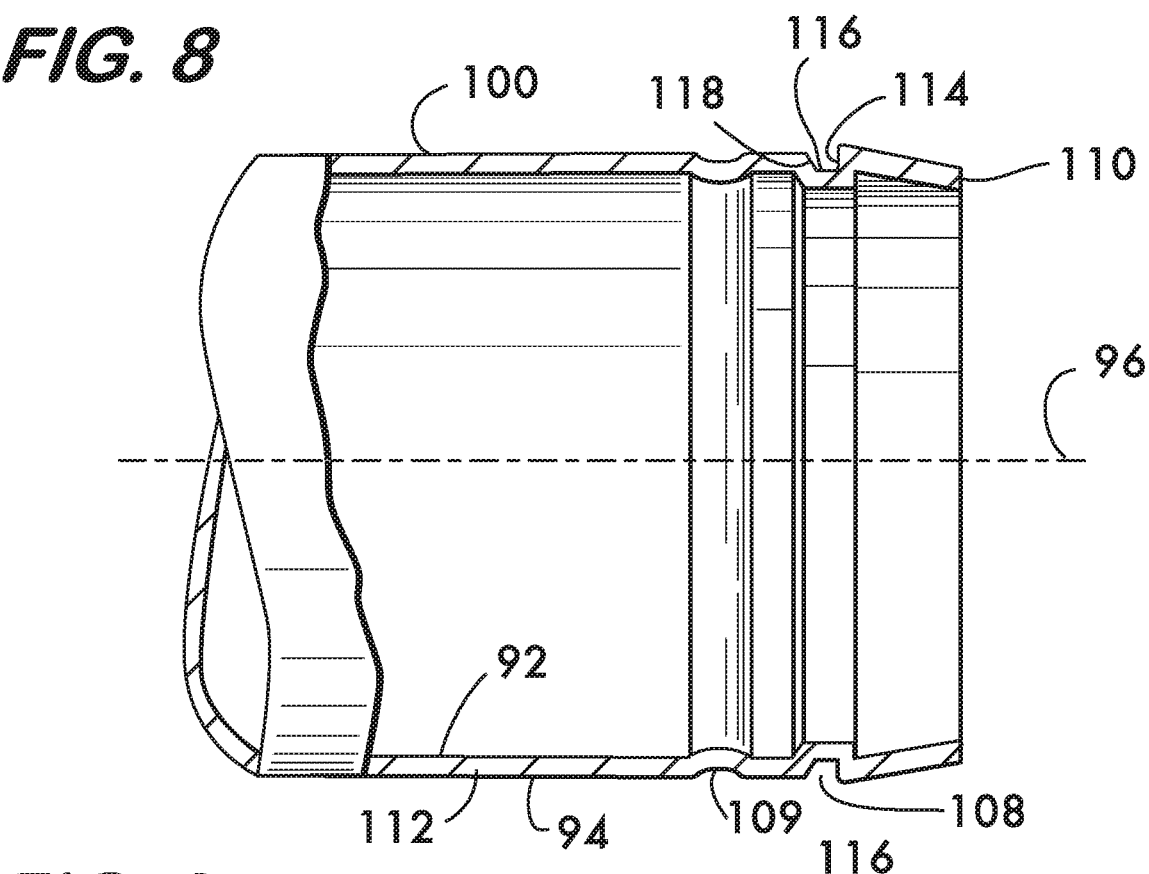
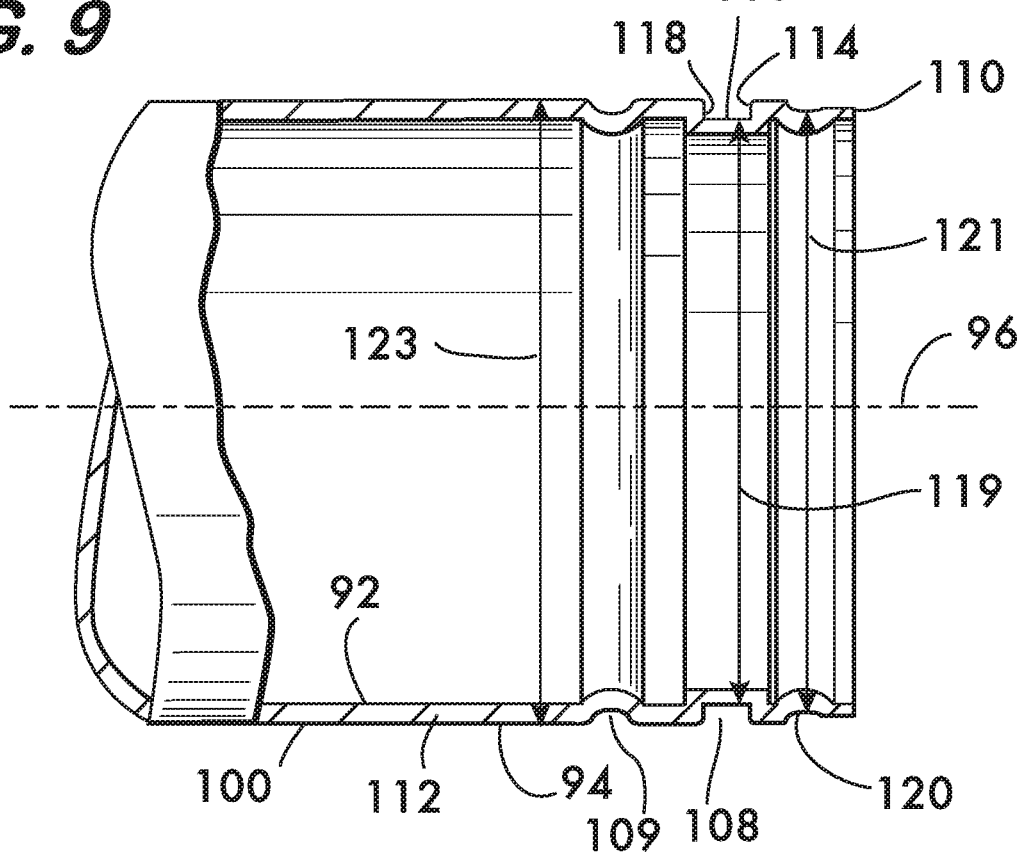

ROLLER SET AND PIPE ELEMENTS

CROSS REFERENCE TO RELATED APPLICATIONS

This application is a divisional of and claims benefit of priority to U.S. patent application Ser. No. 14/512,580, filed Oct. 13, 2014 and hereby incorporated by reference herein.

FIELD OF THE INVENTION

The invention concerns rollers for forming features in ends of pipe elements and also encompasses pipe elements formed by rollers and combinations of pipe elements and couplings joining them end to end.

BACKGROUND

Circumferential grooves and other features such as shoulders and beads may be formed in pipe elements by various methods, one of particular interest being roll grooving. Roll grooving methods involve engaging an inner roller with an inner surface of a pipe element and an outer roller with an outer surface of the pipe element opposite to the inner roller and incrementally compressing the sidewall of the pipe element between the rollers while rotating at least one of the rollers. Rotation of one roller (often the inner roller) causes relative rotation between the roller set and the pipe element, and features on the inner and outer rollers form corresponding features on the inner and outer surfaces of the pipe element. In one example roll grooving method the rollers remain in a fixed location and the pipe element rotates about its longitudinal axis relative to the rollers. In another example embodiment the pipe element remains stationary and the roller set traverses the pipe element's circumference.

One disadvantage of roll grooving is manifest when forming a circumferential groove in the outer surface of the pipe element near an open end. The circumferential groove is formed when a raised circumferential feature on the outer roller cooperates with a circumferential recess on the inner roller positioned opposite to the raised feature. During groove formation, the open end of the pipe element may become enlarged at the end of the pipe element; the end takes on a "bell" shape, flaring outwardly as an unwanted consequence when the material of the pipe is deformed to form the groove. Pipe end flare is unwanted because it can change the critical outer diameter of the pipe element at the end where it is most important not to exceed a maximum tolerance so that, for example, the pipe element may properly engage mechanical fittings or couplings and form a fluid tight joint. There is clearly a need for grooving rollers and a method of roll grooving which mitigates or eliminates pipe end flare.

Furthermore, pipe elements joined by mechanical couplings often use a flexible seal or gasket to effect a fluid tight seal. The gasket has sealing surfaces that are compressed against the outer surfaces of the pipe elements by the couplings. It is advantageous to improve the surface finish of the pipe elements in the region where they are engaged by the sealing surfaces to provide effective surface contact to ensure a good seal.

SUMMARY

The invention concerns a roller set for forming regions of a pipe element having an inner and an outer surface. In one example embodiment the roller set comprises an inner roller engageable with the inner surface. The inner roller comprises an inner roller body. A flange extends circumferentially around the inner roller body. An outer roller is engageable with the outer surface. The outer roller comprises an outer roller body rotatable about a first axis. The inner roller body is rotatable about a second axis. The flange projects transversely to the second axis and is engageable with an end of the pipe element. A first raised feature comprises a first summit. The first summit is engageable with the pipe element, extends circumferentially about the outer roller body and projects radially from the first axis. A second raised feature comprises a second summit. The second summit is engageable with the pipe element, extends circumferentially about the outer roller body and projects radially from the first axis. The second raised feature is positioned adjacent to the first raised feature. A third raised feature comprises a third summit. The third summit is engageable with the pipe element, extends circumferentially about the outer roller body and projects radially from the first axis. The second raised feature is positioned between the first and third raised features. The first and third summits are arranged in spaced relation away from the second summit.

In another embodiment, the roller set comprises an inner roller engageable with the inner surface and an outer roller engageable with the outer surface. In a particular embodiment the outer roller comprises an outer roller body rotatable about a first axis. A first raised feature, engageable with the pipe element extends circumferentially about the outer roller body and projects radially from the first axis. A second raised feature, engageable with the pipe element, extends circumferentially about the outer roller body and projects radially from the first axis. The second raised feature is positioned adjacent to the first raised feature. A third raised feature, engageable with the pipe element, extends circumferentially about the outer roller body and projects radially from the first axis. The second raised feature is positioned between the first and third raised features.

In one example embodiment the second raised feature comprises a ring surrounding the outer roller body. The ring is rotatable about the first axis relatively to the outer roller body. This example further comprises a plurality of bearings positioned between the ring and the outer roller body.

By way of example the first raised feature comprises a conical surface extending lengthwise along the outer roller body. The conical surface has a smaller radius positioned adjacent to the second raised feature and a larger radius positioned distal to the second raised feature.

In another example the third raised feature comprises a curved surface having a maximum radius substantially equal to the larger radius of the conical surface, the radii being measured from the first axis.

By way of further example the second raised feature comprises a projection defined by a first surface facing the first raised feature and oriented substantially perpendicularly to the first axis. A second surface is oriented substantially parallel to the first axis, and a third surface facing the third raised feature is oriented angularly with respect to the first axis. In another example the third raised feature is oriented substantially perpendicularly with respect to the first axis.

By way of example the first raised feature comprises a flat surface oriented substantially parallel with respect to the first axis. In another example the first raised feature further comprises a curved surface, the flat surface being positioned between the curved surface and the second raised feature.

In an example embodiment the third raised feature comprises a curved surface having a maximum radius substantially equal to a maximum radius of the curved surface of comprising the first raised feature, the radii being measured from the first axis.

In another example embodiment the inner roller comprises an inner roller body rotatable about a second axis. A flange extends circumferentially around the inner roller body and projects transversely to the second axis. A first depression extends circumferentially around the inner roller body and is positioned adjacent to the flange. A second depression extends circumferentially around the inner roller body and is positioned adjacent to the first depression. In this example, when the inner and outer rollers cooperate to form the region of the pipe element the first and second raised features align respectively with the first and second depressions.

In an example embodiment the inner roller further comprises a third depression extending circumferentially around the inner roller body and positioned adjacent to the second depression. When the inner and outer rollers cooperate to form the region of the pipe element the first, second and third raised features align respectively with the first, second and third depressions.

In a further example a projection extends circumferentially around the inner roller body and projects radially from the second axis. The projection is positioned between the first and second depressions and has a radius greater than the radius of a portion of the inner roller proximate to the second depression. By way of example the second raised feature of the outer roller comprises a first projection extending circumferentially around the outer roller body and projecting radially from the first axis. The first projection has a first contact width over which it contacts the outer surface of the pipe element during roll forming. The example roller set further comprises a second projection extending circumferentially around the inner roller and projecting radially from a second axis arranged coaxially with the inner roller. The second projection has a second contact width over which it contacts the inner surface of the pipe element during roll forming. By way of example the second contact width is narrower than the first contact width.

The invention further encompasses a method for forming a region of pipe element using an example roller set according to the invention. In one example the method comprises positioning the inner surface of the pipe element on the inner roller and moving the second raised feature of the outer roller into contact with the outer surface of the pipe element. In this example the first, second and third raised features align respectively with the first, second and third depressions. The example also includes rotating the inner roller, thereby rotating the pipe element and the outer roller. While rotating the rollers and the pipe element, the example method calls for forcing the inner and outer rollers toward one another to deform the pipe element between the second raised feature and the second depression. In this example method, upon continued movement of the inner and outer rollers toward one another, the method call for contacting the pipe element with the first raised feature and the third raised feature.

In a particular example, the method further comprises positioning an end of the pipe element in contact with a flange positioned on the inner roller. The example method also comprises moving the second raised feature of the outer roller into contact with the outer surface of the pipe element with the first and second axes being substantially parallel with one another. Also by way of example, the method comprises rotating the inner roller before moving the second raised feature of the outer roller into contact with the outer surface of the pipe element.

In one example of the method the first raised feature contacts the pipe element before the third raised feature. In another example method the third raised feature contacts the pipe element before the first raised feature. In yet another example method, the first and third raised features contact the pipe element substantially simultaneously.

In an example method, the first raised feature contacts the pipe element at an end thereof. In another example method the first raised feature contacts the pipe element over a region in spaced relation to an end thereof. An example method further comprises angularly orienting a longitudinal axis of the pipe element with a longitudinal axis of the inner roller. The example method comprises orienting the longitudinal axis of the pipe element at an orientation angle with respect to the longitudinal axis of the inner roller from about 1° to about 3°.

In one example, the method comprises:
positioning the inner surface of the pipe element on the inner roller with the inner surface contacting the second contact width of the second projection;
moving the first contact width of the first projection into contact with the outer surface of the pipe element, the first and second axes being substantially parallel with one another;
rotating the inner roller, thereby rotating the pipe element and the outer roller;
while rotating the rollers and the pipe element, forcing the inner and outer rollers toward one another to deform the pipe element between the first and second projections.

A particular example of the method comprises contacting the inner surface of the pipe element with the second contact width wherein the second contact width is narrower than the first contact width.

The invention also includes a roller set for forming regions of a pipe element having an inner and an outer surface. In this example the roller set comprises an inner roller engageable with the inner surface and an outer roller engageable with the outer surface. By way of example the outer roller comprises an outer roller body rotatable about a first axis. A first raised feature, engageable with the pipe element extends circumferentially about the outer roller body and projects radially from the first axis. A second raised feature, engageable with the pipe element extends circumferentially about the outer roller body and projects radially from the first axis, the second raised feature being positioned adjacent to the first raised feature. Further by way of example the inner roller comprises an inner roller body rotatable about a second axis. A first depression extends circumferentially around the inner roller body. A second depression extends circumferentially around the inner roller body and is positioned adjacent to the first depression. A projection extends circumferentially around the inner roller body and projects radially from the second axis, the projection being positioned between the first and second depressions and having a radius greater than the radius of a portion of the inner roller proximate to the second depression. In this example, when the inner and outer rollers cooperate to form the region of the pipe element the first and second raised features align respectively with the first and second depressions.

The example further comprises a third raised feature engageable with the pipe element and extending circumferentially about the outer roller body and projecting radially from the first axis. The second raised feature is positioned between the first and third raised features in this example.

The example roller set further comprises a flange extending circumferentially around the inner roller body and projecting transversely to the second axis. In this example the first depression is positioned between the second depression and the flange.

The invention further encompasses a pipe element. In one example embodiment the pipe element comprises an outer surface surrounding a longitudinal axis. The pipe element has at least one end, and a groove is positioned in the outer surface proximate to the at least one end. The groove extends circumferentially around the pipe element. By way of example the groove comprises a first side surface proximate to the at least one end, a floor surface contiguous with the first side surface and a second side surface contiguous with the floor surface. In this example the second side surface is in spaced relation to the first side surface and the first side surface projects radially outwardly beyond a remainder of the outer surface of the pipe element. A tooling mark is positioned in the outer surface and extend circumferentially around the pipe element. In a particular example the tooling mark comprises a depression in the outer surface. In another example the tooling mark comprises indicia embossed in the outer surface. By way of further example the first side surface is oriented substantially perpendicularly to the longitudinal axis and the floor surface is oriented substantially parallel to the longitudinal axis. In an example embodiment the second side surface is oriented substantially angularly with respect to the longitudinal axis. In another embodiment the second side surface is oriented substantially perpendicularly to the longitudinal axis.

The invention further encompasses a combination of at least one pipe element and a coupling. In an example embodiment of such a combination the coupling comprises a plurality of segments attached end to end surrounding a central space. The at least one pipe element is received within the central space. Each of the segments has at least one key projecting toward the central space. The at least one key engages the groove. In an example embodiment the at least one key comprises a first key surface engaged with the first side surface of the groove. A second key surface is contiguous with the first key surface and faces the floor surface of the groove, and a third key surface is contiguous with the second key surface, the third key surface facing the second side surface of the groove.

In a particular example embodiment, the first side surface of the groove and the first key surface of the at least one key are oriented substantially perpendicularly to the longitudinal axis. By way of further example, the second side surface of the groove and the third key surface of the at least one key are oriented angularly to the longitudinal axis, the second side surface engaging the third key surface. In another example embodiment the third key surface has an orientation angle relative to the longitudinal axis equal to an orientation angle of the second side surface. In an example embodiment the second side surface of the groove and the third key surface of the at least one key are oriented substantially perpendicularly to the longitudinal axis. In a particular example, the second key surface of the at least one key engages the floor surface of the groove.

In a specific example embodiment the coupling further comprises connection members positioned at opposite ends of each of the segments. The connection members are adjustably tightenable for drawing the segments toward one another and the at least one key on each of the segments into engagement with the groove. By way of example the connection members on each of the segments comprise a pair of projections, one the projection being positioned on each of the opposite ends of the segments, the projections having holes to receive a fastener, the fastener being adjustably tightenable. In a particular example embodiment the coupling comprises two of the segments.

The invention further contemplates a pipe element. In one example embodiment the pipe element comprises an outer surface surrounding a longitudinal axis and has at least one end. A groove is positioned in the outer surface proximate to the at least one end. The groove extends circumferentially around the pipe element. By way of example the groove comprises a first side surface proximate to the at least one end, the first side surface being substantially perpendicular to the longitudinal axis; a floor surface contiguous with the first side surface and oriented substantially parallel to the longitudinal axis; and a second side surface contiguous with the floor surface and oriented substantially angularly with respect to the longitudinal axis. In this example the first side surface projects radially outwardly beyond a remainder of the outer surface of the pipe element and a tooling mark is positioned in the outer surface and extends circumferentially around the pipe element. In an example embodiment the tooling mark comprises a depression in the outer surface. In a further example the tooling mark comprises indicia embossed in the outer surface.

The invention further includes, by way of example, a combination of at least one pipe element and a coupling. In a specific example the coupling comprises a plurality of segments attached end to end surrounding a central space. The at least one pipe element is received within the central space. Each of the segments has at least one key projecting toward the central space. The at least one key engages the groove. By way of example the at least one key comprises a first key surface oriented substantially perpendicularly to the longitudinal axis and engaged with the first side surface of the groove, a second key surface contiguous with the first key surface and facing the floor surface of the groove, and a third key surface contiguous with the second key surface. The third key surface is angularly oriented with respect to the longitudinal axis and is engaged with the second side surface of the groove.

In an example embodiment the third key surface has an orientation angle relative to the longitudinal axis equal to an orientation angle of the second side surface. By way of example the coupling further comprises connection members positioned at opposite ends of each of the segments. The connection members are adjustably tightenable for drawing the segments toward one another and the at least one key on each of the segments into engagement with the groove. In a specific example the connection members on each of the segments comprise a pair of projections, one the projection being positioned on each of the opposite ends of the segments, the projections having holes to receive a fastener, the fastener being adjustably tightenable. In a particular example the coupling comprises two of the segments.

The invention further encompasses a pipe element. By way of example the pipe element comprises an outer surface surrounding a longitudinal axis and has at least one end. A groove is positioned in the outer surface proximate to the at least one end. The groove extends circumferentially around the pipe element. At least a portion of the outer surface of the pipe element between the groove and the at least one end is a burnished surface. By way of example a tooling mark is positioned in the outer surface and extends circumferentially around the pipe element. In a specific example the tooling mark comprises a depression in the outer surface. By way of example the tooling mark comprises indicia embossed in the outer surface. In a specific example the burnished surface comprises a sealing surface engageable with a seal. By way of further example the burnished surface is oriented substantially parallel to the longitudinal axis. In a particular example the burnished surface is positioned in spaced relation away from the at least one end. In an example embodiment the burnished surface has a diameter tolerance substantially equal to a diameter tolerance of a floor of the groove. By way of example the burnished surface has a diameter tolerance from about 20% to about 50% of a diameter tolerance of the pipe element.

In another example pipe element according to the invention the groove comprises a first side surface proximate to the at least one end, a floor surface contiguous with the first side surface and a second side surface contiguous with the floor surface. In this example the second side surface is in spaced relation to the first side surface. In an example embodiment the first side surface projects radially outwardly beyond the outer surface of the pipe element in its entirety. By way of example the first side surface is oriented substantially perpendicularly to the longitudinal axis. By way of example the floor surface is oriented substantially parallel to the longitudinal axis. Further by way of example the second side surface is oriented substantially angularly with respect to the longitudinal axis. In another example embodiment the second side surface is oriented substantially perpendicularly to the longitudinal axis.

BRIEF DESCRIPTION OF THE DRAWINGS

FIGS. 1B-1D and 1F show longitudinal sectional views of example rollers according to the invention;

FIG. 1E shows a partial sectional view of a component of the roller set of FIG. 1 on an enlarged scale;

FIGS. 8 and 9 show partial longitudinal sectional views of example pipe elements roll formed according to the invention;

DETAILED DESCRIPTION

Figure 1:
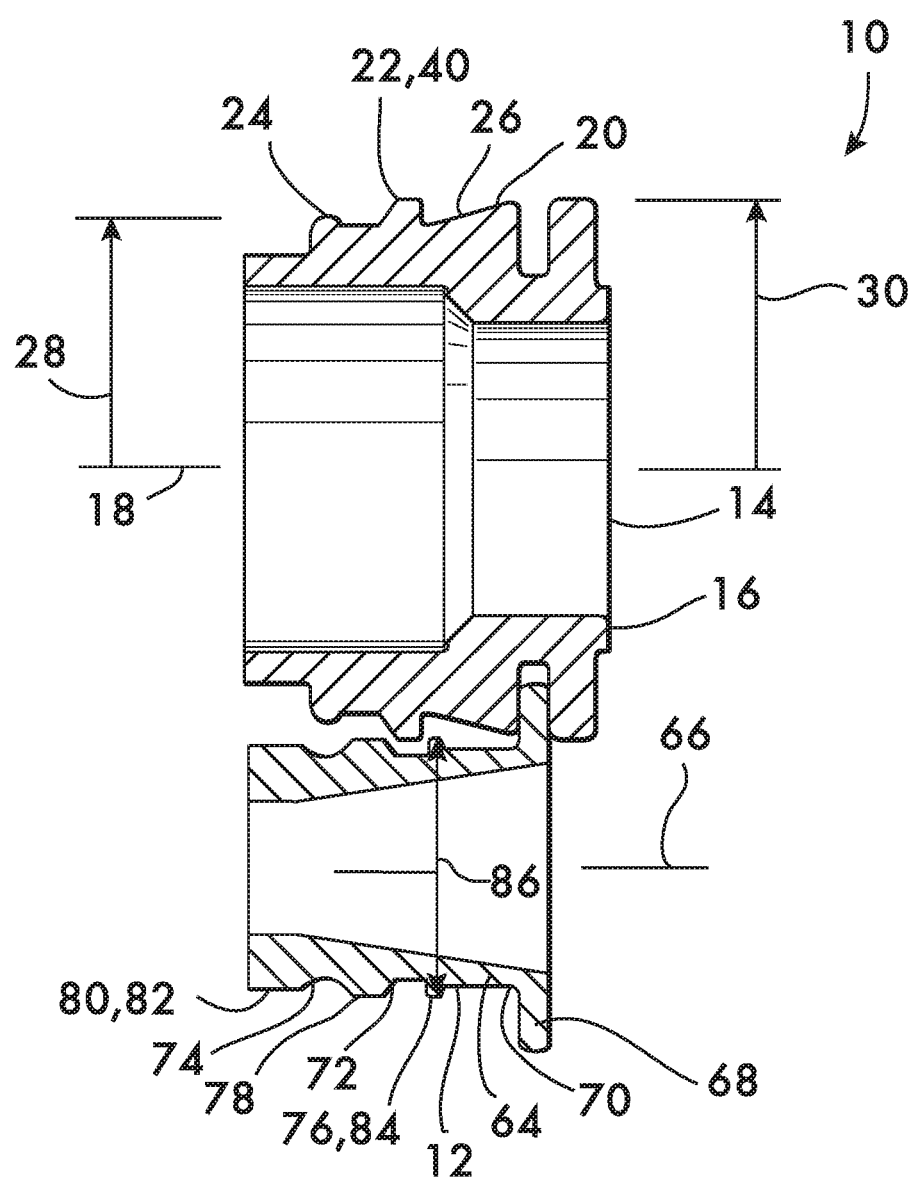
FIG. 1 shows a longitudinal sectional view of an example roller set according to the invention.

FIG. 1 shows a roller set 10 for roll forming a pipe element (not shown). Roller set 10 comprises an inner roller 12 engageable with an inner surface of the pipe element, and an outer roller 14 engageable with an outer surface of the pipe element. As described below, the sidewall of the pipe element is compressed between the inner and outer rollers 12 and 14 which cooperate to impart various shapes to the surfaces and sidewall of the pipe element.

In the example embodiment of FIG. 1, outer roller 14 comprises a roller body 16 that is rotatable about a first axis 18. Axis 18 is a longitudinal axis, and the roller body 16 has a plurality of raised features 20, 22 and 24 that extend circumferentially around it and project radially from axis 18. The first raised feature 20 is located on roller body 16 so that it can engage the outer surface of the pipe element near its end and comprises a conical surface 26 extending lengthwise along the roller body and projecting radially from axis 18. Conical surface 26 has a smaller radius 28 positioned adjacent to the second raised feature 22 and a larger radius 30 positioned distal to the second raised feature. First raised feature 20 is used to mitigate, control or prevent flaring of the end of the pipe element being worked between the rollers 12 and 14 as described in detail below.

Figure 2C:
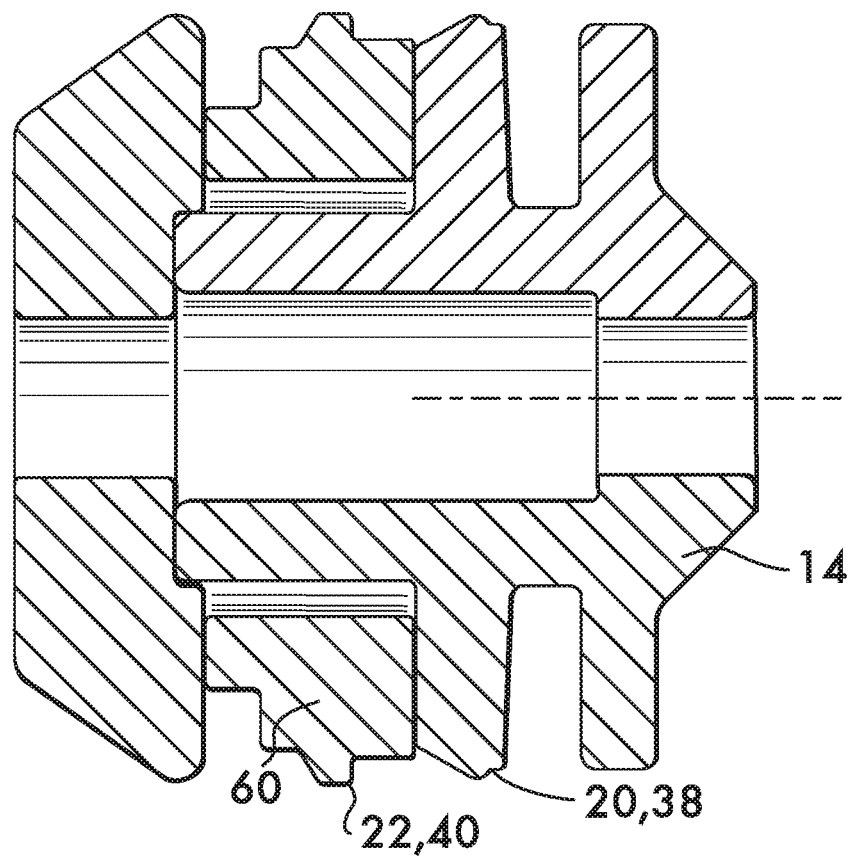
FIGS. 2A-2C show longitudinal sectional views of example rollers according to the invention.
Figure 2:
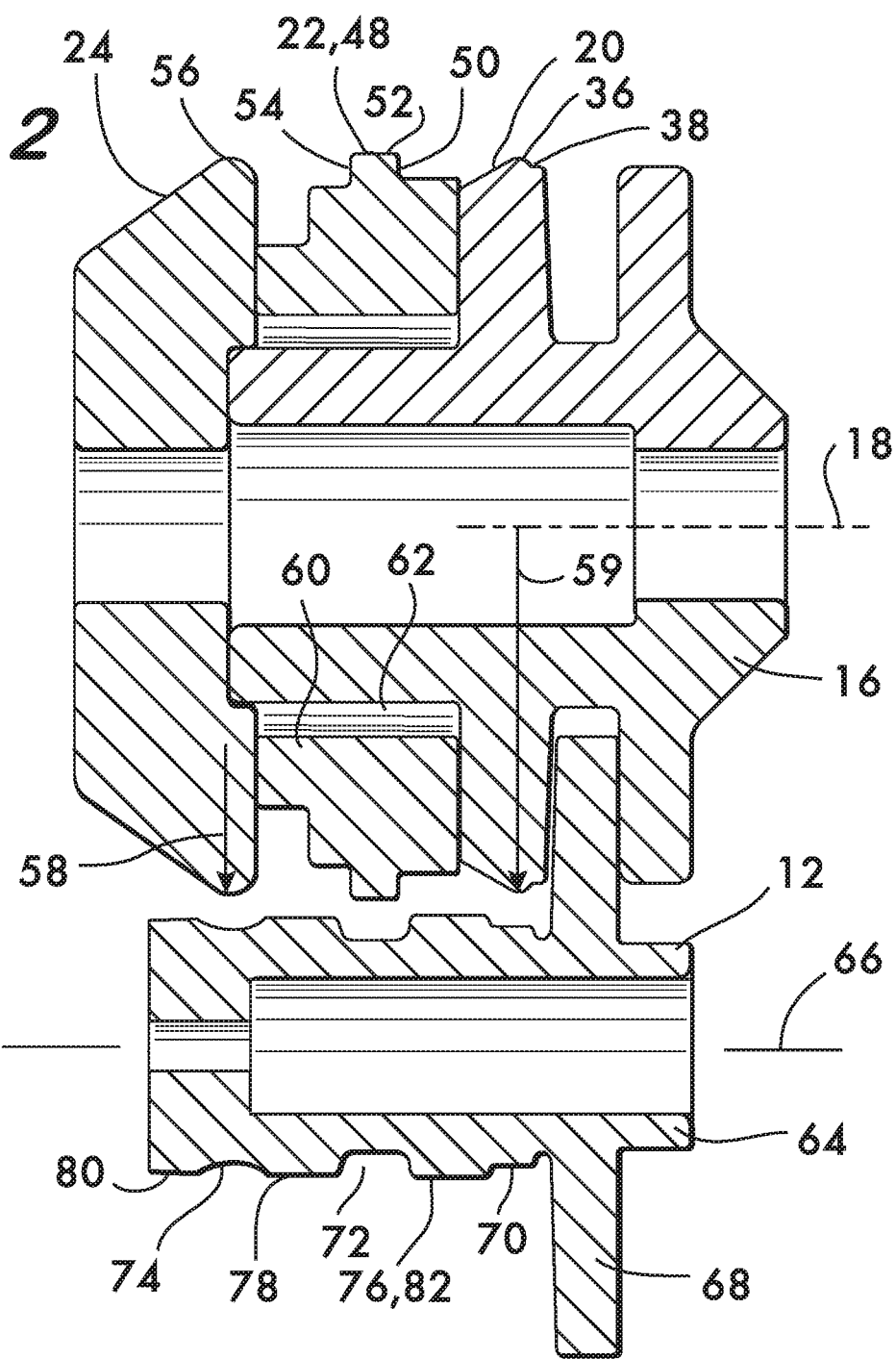
FIG. 2 shows a longitudinal sectional view of another example roller set according to the invention.

FIG. 2 shows another example embodiment of a roller body 16 wherein the first raised feature 20 comprises a curved surface 36 and a substantially flat surface 38 oriented substantially parallel with respect to the axis 18. The curved surface 36 projects radially from axis 18 and is used to burnish the outer surface of the pipe element near its end as described below.

Figure 1A:
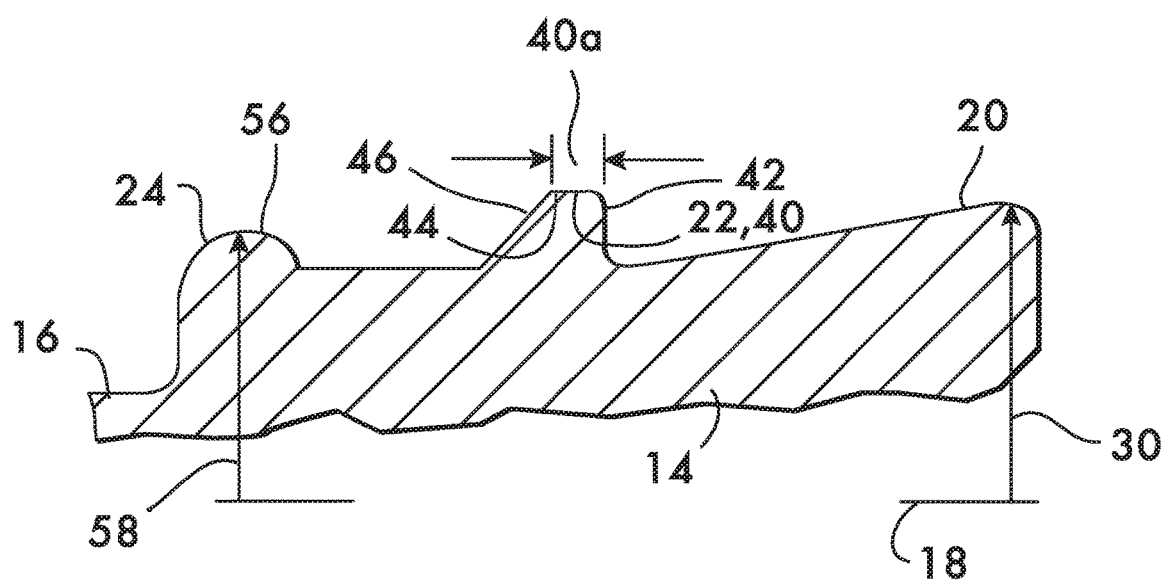
FIG. 1A shows a partial sectional view of a component of the roller set of FIG. 1 on an enlarged scale.

With reference again to FIG. 1, the second raised feature 22 is shown as a projection 40. As shown in FIG. 1A, projection 40 extends circumferentially around the roller body 16 and is defined by a first surface 42 facing the first raised feature 20 and oriented substantially perpendicularly to the axis 18, a second surface 44 contiguous with the first surface 42 and, in this example, oriented substantially parallel to the axis 18, and a third surface 46 contiguous with the second surface 44 and facing the third raised feature 24. In this example the third surface 46 is oriented angularly with respect to the axis 18.

FIG. 2 shows the example roller body 16 wherein the second raised feature 22 is shown as a projection 48. Projection 48 extends circumferentially around the roller body 16 and is defined by a first surface 50 facing the first raised feature 20 and oriented substantially perpendicularly to the axis 18, a second surface 52 contiguous with the first surface 50 and, in this example, oriented substantially parallel to the axis 18, and a third surface 54 contiguous with the second surface 52 and facing the third raised feature 24. In this example the third surface 54 is oriented substantially perpendicularly to the axis 18. In the example roller embodiments shown in FIGS. 1 and 2 the second raised feature 22, in either form, is used to form a circumferential groove in the pipe element as described below.

As shown in FIGS. 1A and 2, the third raised feature 24 comprises a curved surface 56 that projects radially from axis 18 and has a maximum radius 58 which may be substantially equal to the maximum radius 59 of the curved surface 36 of the first raised feature 20 (FIG. 2), or the larger radius 30 of the conical surface 26 (FIG. 1A). Curved surface 56 of the third raised feature 24 is used to prevent the pipe element from teetering and thereby losing tracking stability when the first and second raised features 20 and 22 engage the pipe element as described below.

Figure 3:
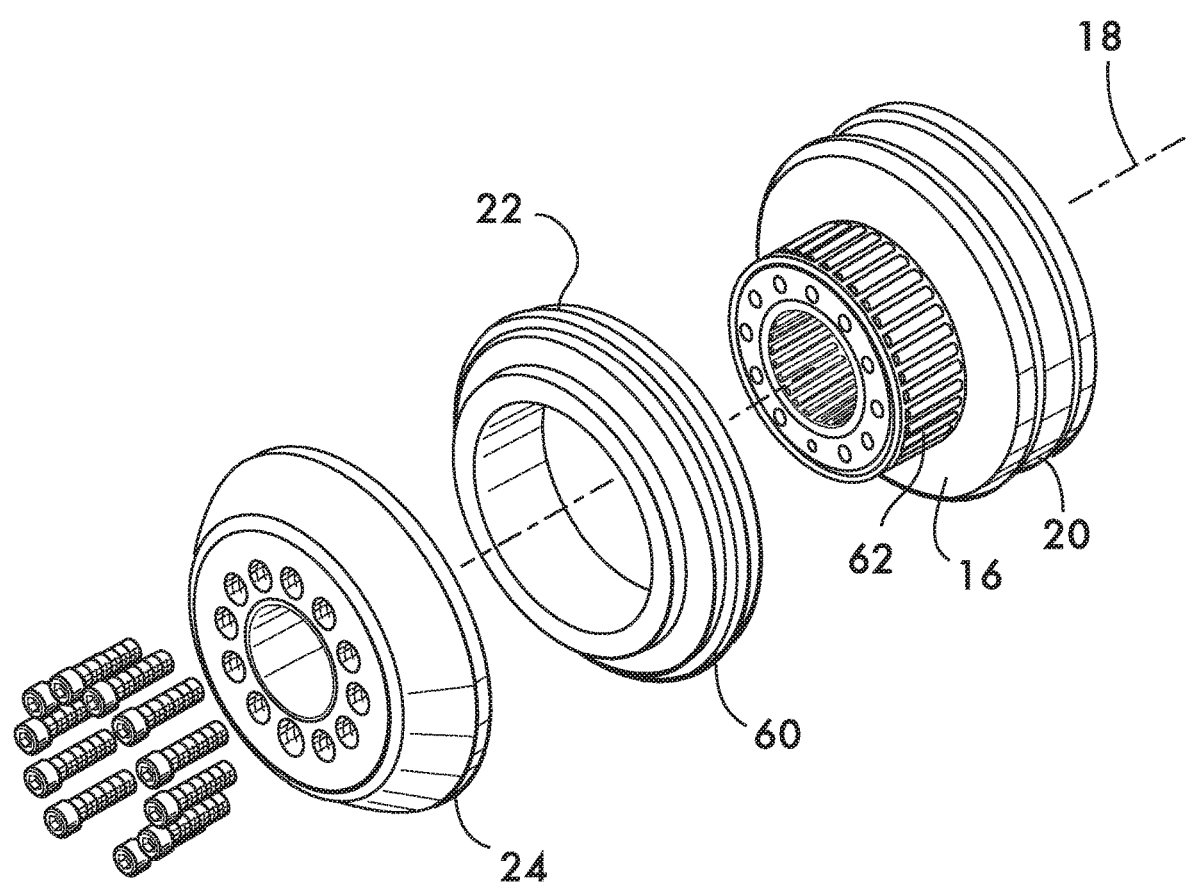
FIG. 3 shows an exploded isometric view of an example roller according to the invention.

As shown in FIGS. 2 and 3, it is sometimes advantageous to position the second raised feature 22 on a ring 60. Ring 60 surrounds the outer roller body 16 and is rotatable independently thereof about the axis 18. Bearings 62 may be positioned between the ring 60 and the outer roller body 16 to reduce friction between the ring 60 and the roller body 16. By allowing the ring to rotate independently of the roller body, friction between the outer roller 14 and the pipe element is reduced. Friction between the roller body and the pipe element occurs when raised features having different radii contact the pipe element. The linear speed of the surface of the raised feature is proportional to its radius from the axis of rotation (in this example axis 18). Thus, for a given angular speed of the outer roller 14 and pipe element, the first and third raised features 20 and 24 will have slower linear surface speeds than the second raised feature 22 due to its larger radius. If the second raised feature 22 is not permitted to rotate independently of the first and third raised features 20 and 24, then there will be slippage between the pipe element and the first and third raised features (or vice versa) which will result in friction and concomitant heat and vibration. This is undesirable, hence the advantage of using ring 60 with bearings 62.

Figure 2A:
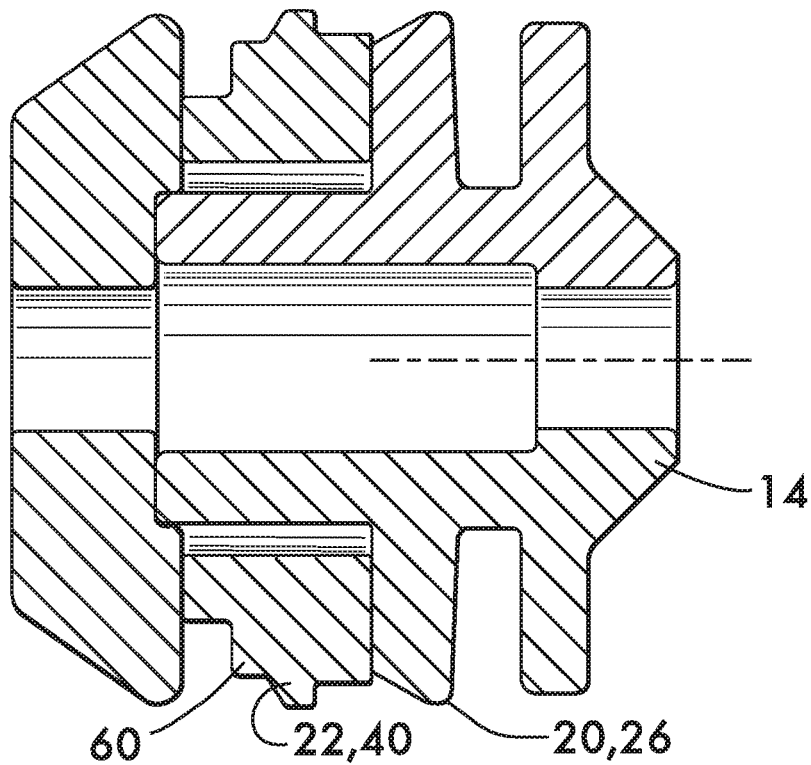
Figure 2B:
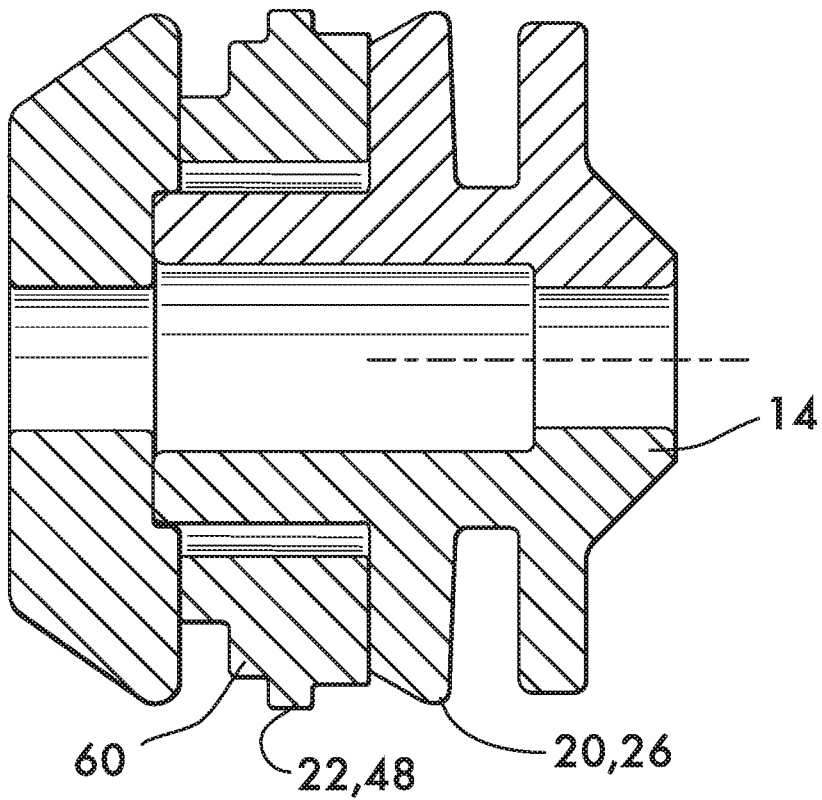

While FIG. 1 illustrates an outer roller 14 with a second raised feature 22 being a projection 40, and a first raised feature 20 comprising a conical surface 26, and FIG. 2 illustrates an outer roller 14 having its second raised feature 22 in the form of a projection 48 on a ring 60 and its first raised feature 20 comprising burnishing surface 38, it is understood that all combinations of these various features are feasible. For example, FIG. 1B illustrates an outer roller 14 having a projection 48 as its second raised feature 22 and a conical surface 26 as its first raised feature; FIG. 1C illustrates an outer roller 14 having a projection 40 as its second raised feature 22 and a burnishing surface 38 as its first raised feature 20; FIG. 1D illustrates an outer roller 14 having a projection 48 as its second raised feature 22 and a burnishing surface 38 as its first raised feature 20; FIG. 2A illustrates an outer roller 14 having a projection 40 as its second raised feature 22 on a ring 60, and a conical surface 26 as its first raised feature 20; FIG. 2B illustrates an outer roller 14 having a projection 48 as its second raised feature 22 on a ring 60, and a conical surface 26 as its first raised feature 20; FIG. 2C illustrates an outer roller 14 having a projection 40 as its second raised feature 22 on a ring 60, and a burnishing surface 38 as its first raised feature 20.

FIGS. 1, 1E and 2 show an inner roller 12. In this example inner roller 12 comprises an inner roller body 64 rotatable about a longitudinal axis 66. A flange 68 extends circumferentially around the roller body 64 and projects transversely to axis 66. A first depression 70 in the body 64 extends circumferentially there around and is positioned adjacent to (in this example, contiguous with) the flange 68. A second circumferentially extending depression 72 is positioned in the roller body 64 adjacent to the first depression 70, and a third circumferentially extending depression 74 is positioned in the roller body 64 adjacent to the second depression. As shown in FIGS. 1 and 2, the first, second and third raised features 20, 22 and 24 align respectively with the first, second and third depressions 70, 72 and 74. Together the raised features 20, 22 and 24 cooperate with the depressions 70, 72 and 74 to roll form the pipe element as described below.

The depressions 70, 72 and 74 shown in FIGS. 1, 1E and 2 are in part defined by first, second and third lands 76, 78 and 80. First land 76 is positioned between the first and second depressions 70 and 72, the second land 78 is positioned between the second and third depressions 72 and 74 and the third land 80 is positioned on roller body 64 adjacent to the third depression 74. First, second and third lands 76, 78 and 80 advantageously have substantially flat, relatively broad surfaces 82 which engage the pipe element during roll forming. Land surfaces 82 may be knurled to provide purchase between the inner roller 12 and the pipe element to facilitate rotation of the pipe element without significant slippage between it and the inner roller 12 when the inner roller is the driven roller as described below. In the example inner roller 12 shown in FIG. 2, the first land 76 has a land surface 82 similar to the second and third lands 78 and 80. However, in the example inner roller 12 of FIGS. 1 and 1E, the first land 76 comprises a projection 84 that extends circumferentially around inner roller body 64 and project radially from axis 66. Projection 84 has a maximum diameter 86 greater than the maximum diameter of the remaining portion of the inner roller 12 except for flange 68. Projection 84 cooperates with the second raised feature 22 to roll form pipe elements having a circumferential groove wherein a side surface of the groove projects beyond the surface of the pipe element as described below. Comparison of FIGS. 1A and 1E shows respective contact widths 40a on projection 40 and 84a on projection 84. Contact widths 40a and 84a are the linear distance over which the projections 40 and 84 contact the pipe element during roll forming. It has been determined that the relative size of these two contact widths 40a and 84a controls the height of enlargement of the groove side surface beyond the surface of the pipe as described below.

Figure 1F:
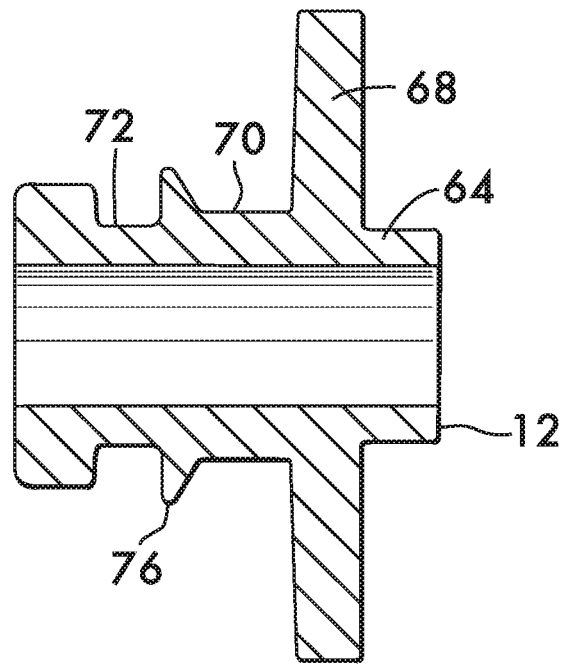

Another embodiment of inner roller 12 is shown in FIG. 1F. In this embodiment, inner roller 12 comprises a body 64 having a flange 68, and first and second depressions 70 and 72 separated from one another by a land 76.

Figure 4:
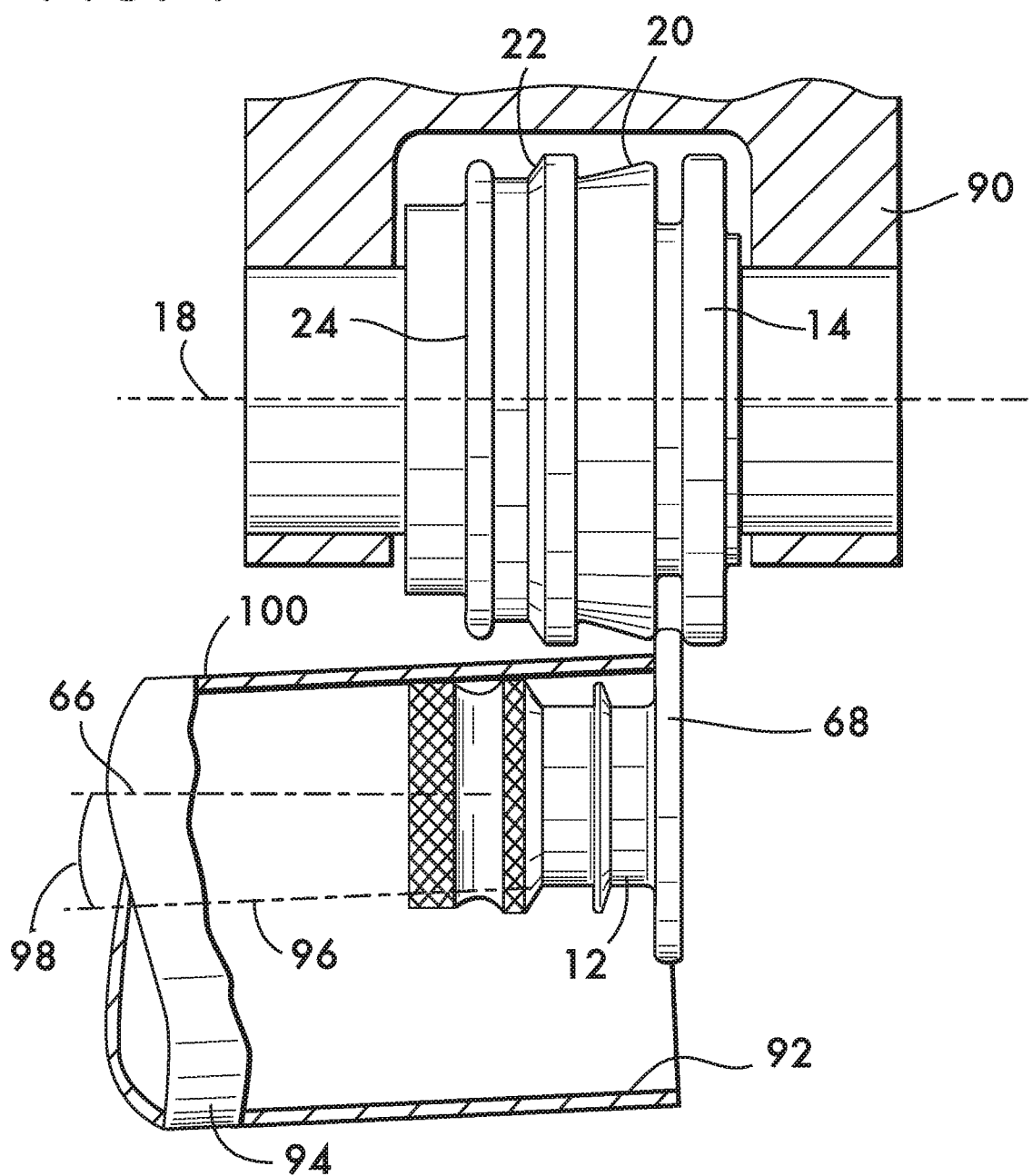
FIGS. 4-7 are elevational views illustrating example roller sets in use roll forming pipe elements.

Operation of the roller set 10 is illustrated in FIGS. 4-7. As shown in FIG. 4, inner roller 12 is the driven roller (rotated, for example by an electric motor, not shown) and outer roller 14 is an idler. The outer roller 14 is positioned on an adjustable yoke 90 allowing the outer roller to be moved toward and away from the inner roller 12. Yoke 90 is advantageously movable by a hydraulic actuator (not shown) but other types of actuators are also feasible. With the outer roller 14 moved away from the inner roller 12, an inner surface 92 of the pipe element 94 is positioned on the inner roller 12. It is advantageous for the longitudinal axis 96 of pipe element 94 to be angularly oriented initially with respect to the axis of rotation 66 of the inner roller 12. Relative orientation angles 98 from about 1° to about 3° are effective for keeping the pipe element 94 reliably in contact with the roller set, as it is found that the pipe element 94, pinched between the rollers 12 and 14, will be drawn toward the flange 68 as the rollers rotate if an orientation angle 98 between the longitudinal axis 96 of the pipe element 94 and the inner roller 12 is maintained. Formation of the groove retains the pipe element 94 in engagement with the roller set 10 during roll forming by mechanical engagement. If, however, the angle 98 of the axis 96 of pipe element 94 relative to the axis 66 is permitted to reverse before the groove begins to form then the pipe element will spiral out of engagement with the roller set if not forcibly restrained.

Figure 5:
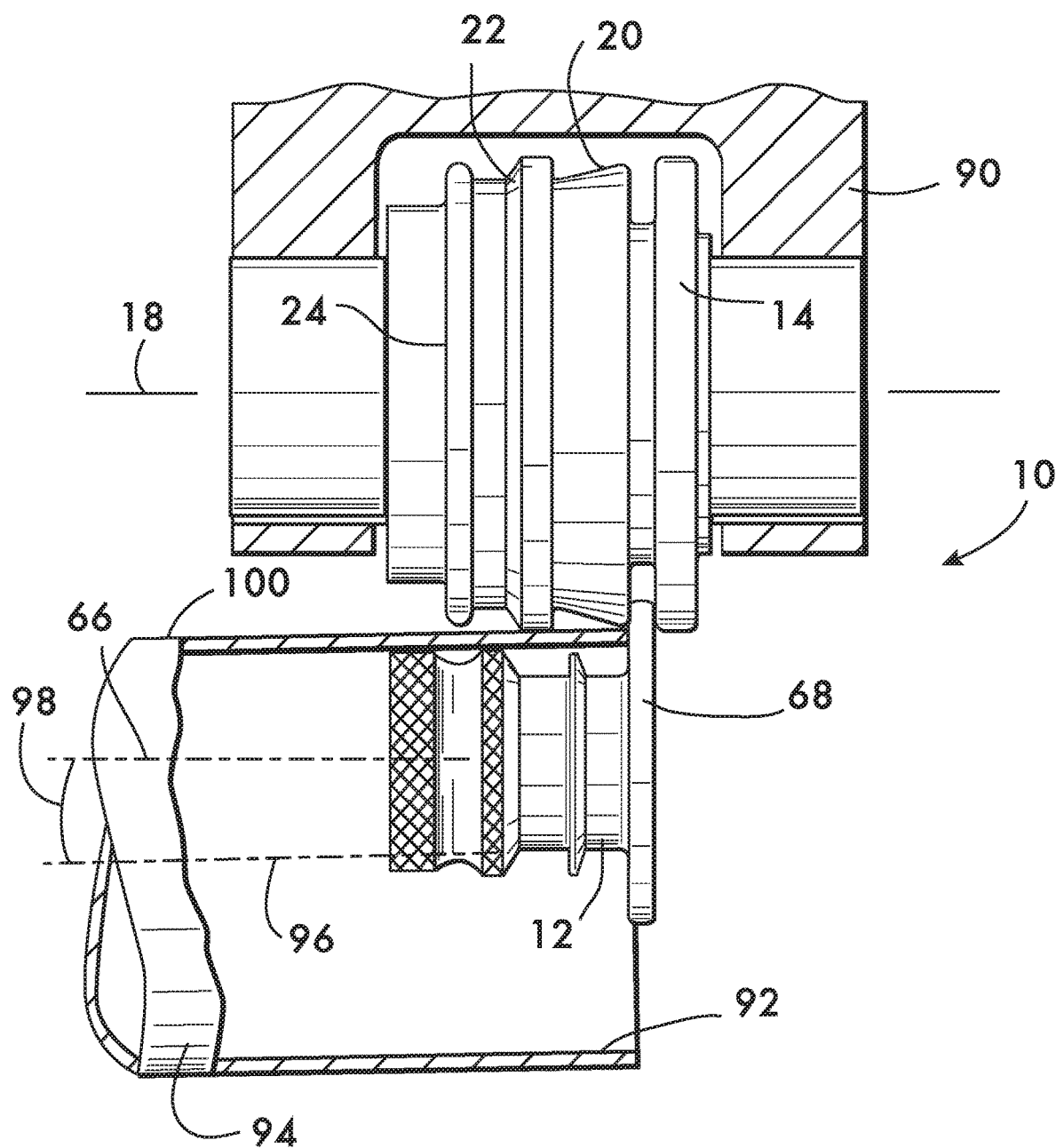
Figure 5A:
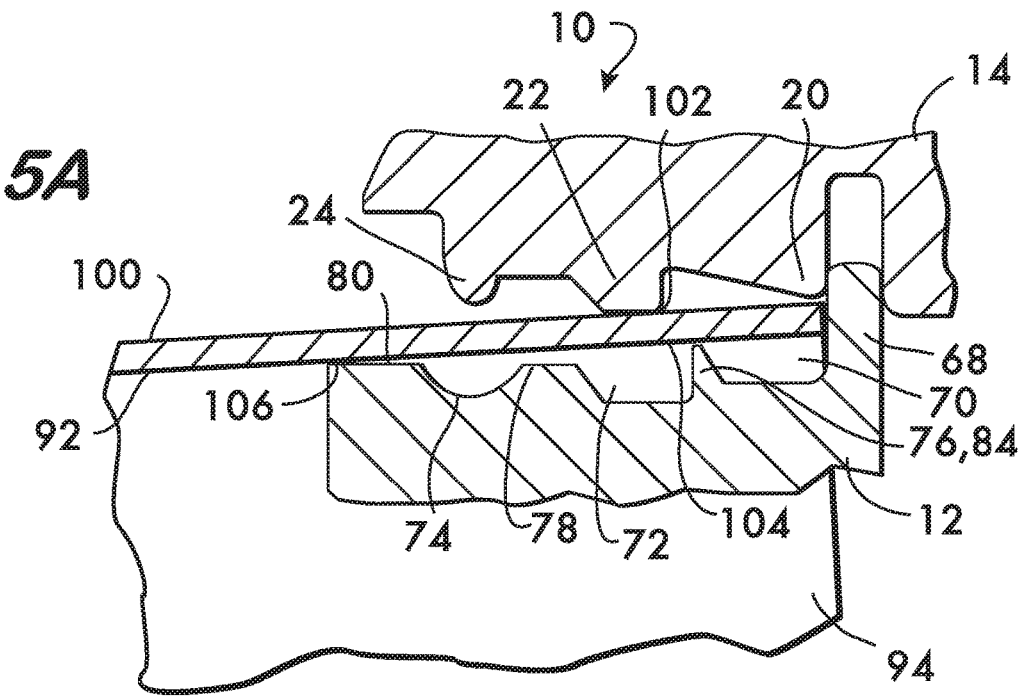
FIGS. 5A and 6A show longitudinal sectional views of the example roller set in FIGS. 4-7 on an enlarged scale.
Figure 6A:
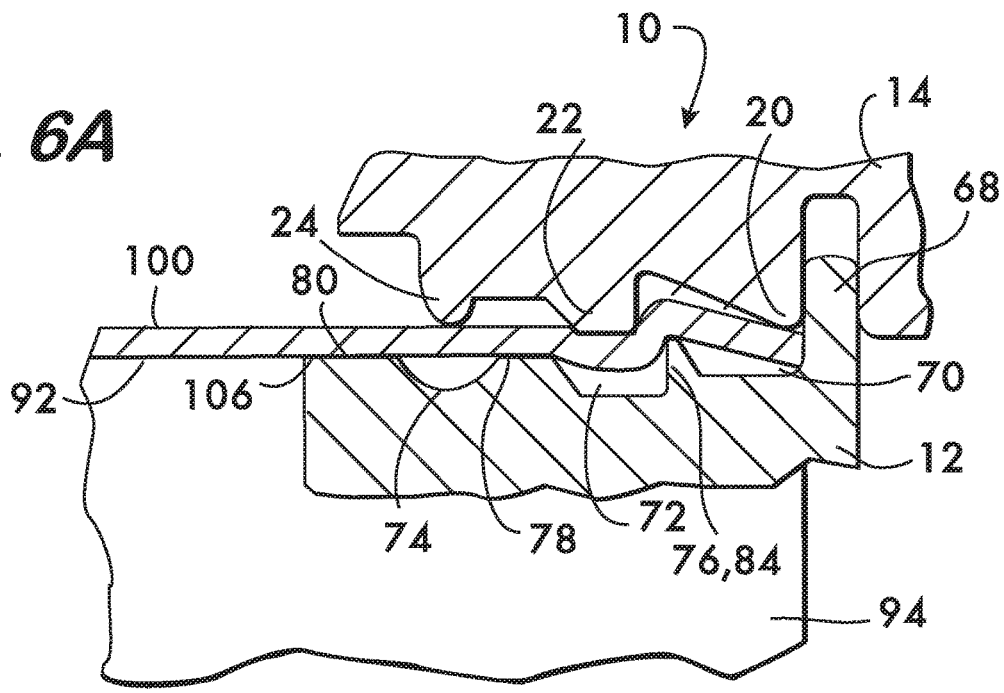
Figure 6:
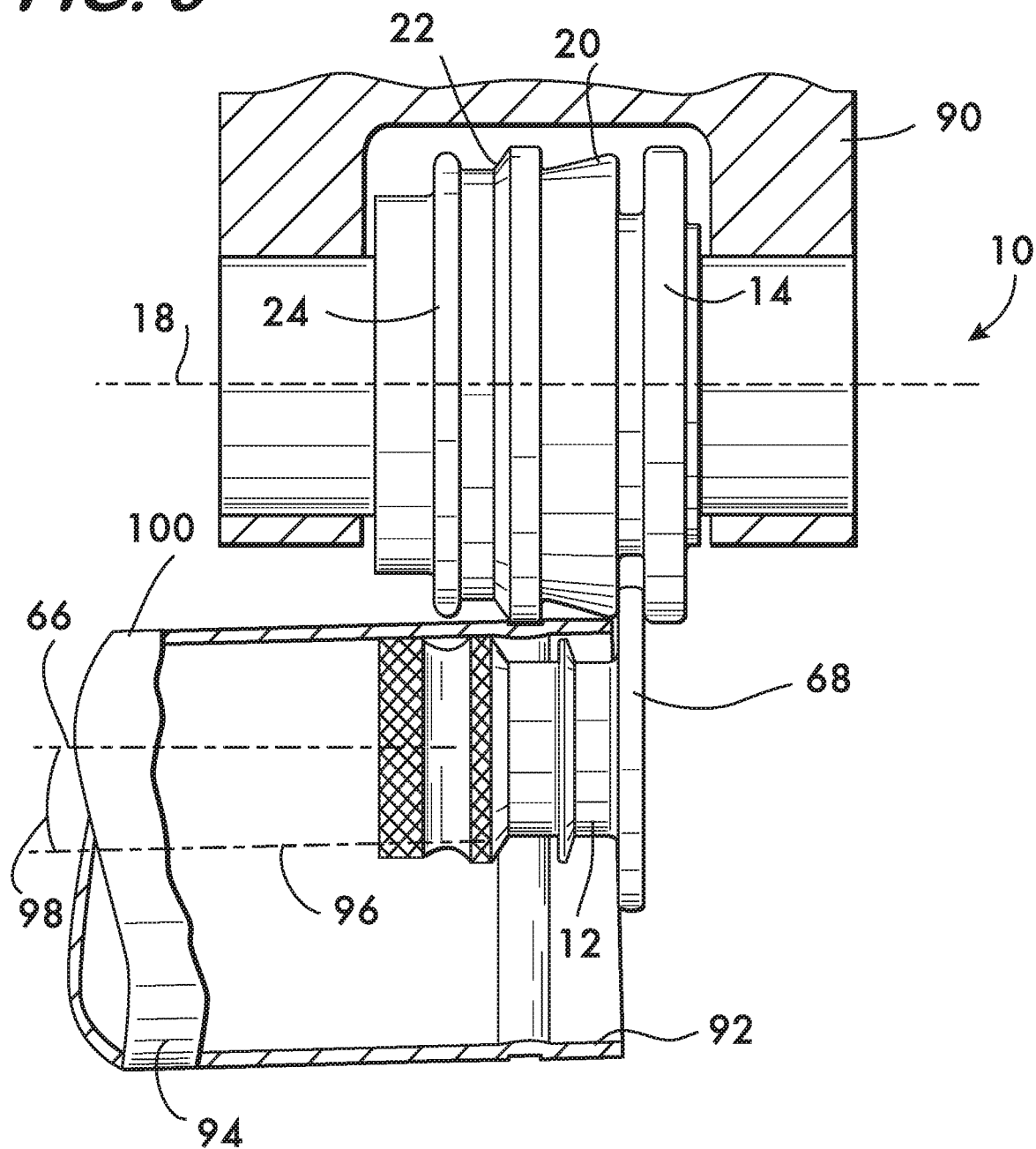
Figure 7:
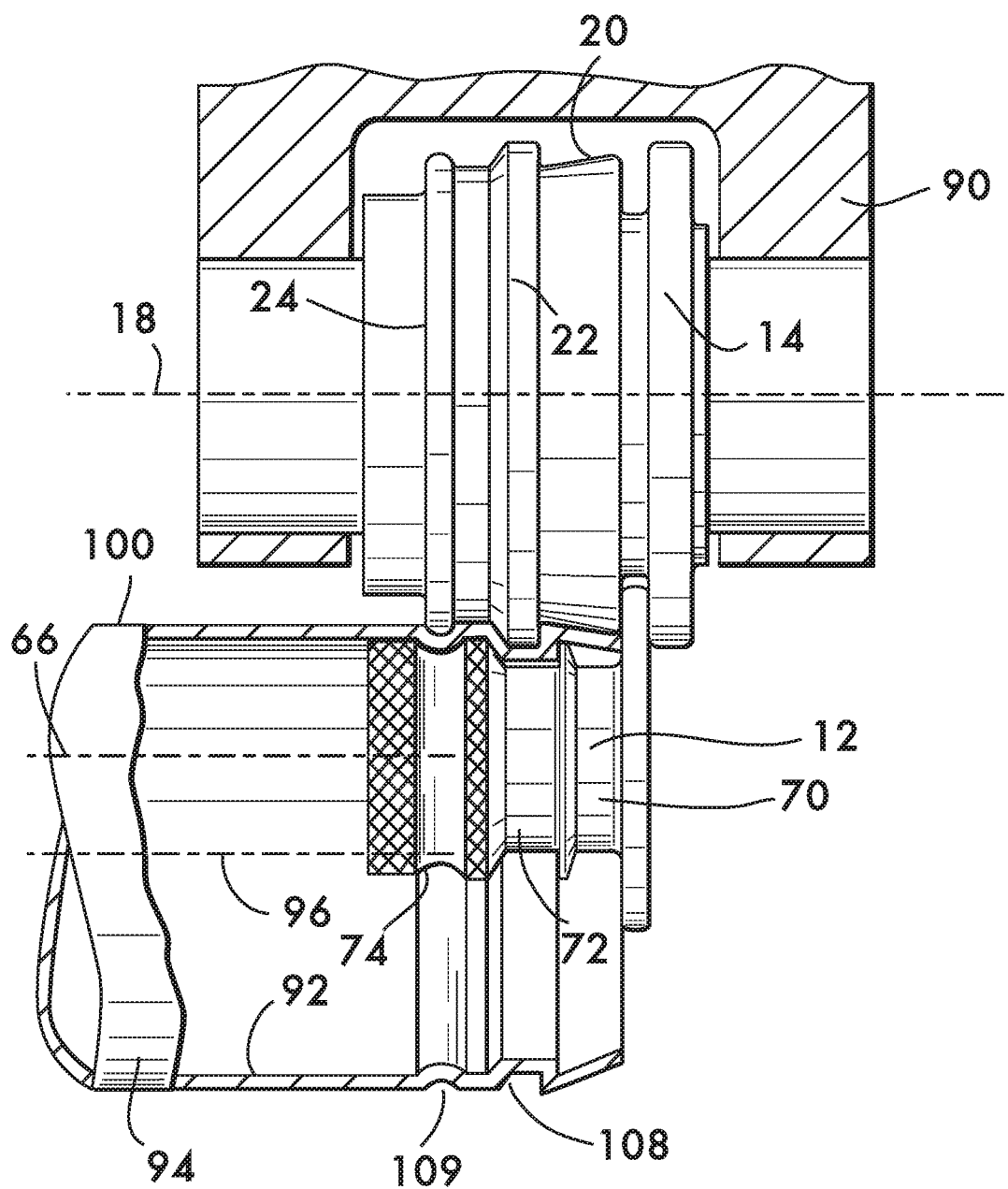

As shown in FIG. 5, with axis 18 of outer roller 14 and axis 66 of inner roller 12 substantially parallel to one another, outer roller 14 is moved into contact with the outer surface 100 of pipe element 94. As shown in detail in FIG. 5A, there are three initial points of contact between the roller set 10 and the pipe element 94 as follows: point 102 between the second raised feature 22 and the outer surface 100; point 104 between the pipe element inner surface 92 and the projection 84 of inner roller 12; and point 106 between pipe element inner surface 92 and third land 80 of inner roller 12. As shown in FIG. 6, the outer roller 14 is moved via yoke 90 toward the inner roller 12 as the roll set 10 and pipe element 94 rotate to roll form the pipe element. Rotation is effected by driving the inner roller 12 about axis 66 in this example, which causes the pipe element 94 and outer roller 14 to rotate about axes 96 and 18 respectively. As shown in FIG. 6A, as the pipe element 94 deforms due to contact with second raised feature 22, the first raised feature 20 begins to engage the pipe element 94 at or near its end, for example to prevent the end from flaring (shown) or to burnish a portion of the surface as would occur if the outer roller 14 of FIG. 2 were used. Forced contact between the first raised feature 20 and the end of the pipe element 94 may cause the pipe element to teeter about the projection 84 on inner roller 12 and lift off of the contact point 106 (between inner surface 92 and third land 80). This teetering action may reverse the orientation angle 98 between the pipe element's longitudinal axis 96 and the axis 66 of the inner roller 12 (see FIG. 6) and cause the pipe element to spiral out of contact with the roller set 10. Relatively short pipe elements (5-6 feet or less) are particularly prone to this phenomenon. However, contact between the third raised feature 24 and the outer surface 100 of the pipe element 94 counteracts this tendency for the pipe element to teeter and prevents the orientation angle 98 from reversing so that the pipe element 94 tracks toward the flange 68 and stays in contact with the roller set. Contact between the third raised feature 24 and the outer surface 100 of the pipe element 94 may first occur when the groove is about 50% to 70% formed. FIG. 7 shows the formation of a circumferential groove 108, wherein the first, second and third raised features 20, 22 and 24 are aligned with the first, second and third depressions 70, 72 and 74, the raised features and depressions cooperating with one another to roll form the pipe element 94. The third raised feature 24 also forms a tooling mark 109 in the outer surface 100 of the pipe element 94. Tooling mark 109 extends circumferentially around the pipe element and may comprise a relatively shallow depression and/or embossed indicia that identify the model number and/or source of the product. The tooling mark may also provide evidence or guidance for proper installation of the pipe element relative to a coupling.

Timing of contact between the various raised features 20, 22, 24 and the outer surface 100 of pipe element 94 is controlled mainly by the geometry of the outer roller 14 including the relative diameters of the first and third raised features 20 and 24. The geometry of the outer roller 14 for a particular size pipe element 94 may be arranged to ensure that, for example, the first raised feature 20 contact the pipe element before the third raised feature 24, or the third raised feature contacts the pipe element before the first raised feature, or both the first and third raised features contact the pipe element substantially simultaneously. As shown in a comparison of FIGS. 1 and 2, the geometry of the outer roller 14 may also be tailored so that the first raised feature 20 contacts the pipe element substantially at an end thereof (FIG. 1), or over a region of the pipe element in spaced relation to the end (FIG. 2). The geometry of raised feature 20 of outer roller 14 shown in FIG. 1 is useful for preventing or mitigating flare of the pipe element 94, and can also be used to roll form a conical taper to the end of a pipe element. The geometry of raised feature 20 of outer roller 14 shown in FIG. 2 is useful for burnishing a portion of the outer surface 100 of the pipe element 94 to provide a smooth surface that facilitates a fluid tight seal with a gasket as described below. It is expected that surface finishes with a roughness (Ra) from about 250 μ in to about 0.1 μ in (as measured according to ASME Y14.36M) will be achievable using roller sets according to the invention, and that this range of surface roughness will provide an interface affording a fluid tight seal between the pipe element and the gasket.

FIGS. 8 and 9 show example pipe elements roll formed using roller sets 10 according to the invention. As shown in FIG. 8, pipe element 94 has an end 110 and comprises a sidewall 112 between outer surface 100 and inner surface 92. Circumferential groove 108 is positioned in the outer surface 100 and comprises a first side surface 114 proximate to end 110, a floor surface 116 contiguous with the first side surface 114, and a second side surface 118 contiguous with the floor surface 116 and in spaced relation to the first side surface 114. In this example pipe element the floor surface 116 is oriented substantially parallel to axis 96 and the second side surface 118 is oriented angularly with respect thereto. The first side surface 114 projects radially outwardly beyond the outer surface 100 of the pipe element 94 in its entirety. This configuration of the first side surface 114 is achieved by interaction between the projection 84 on inner roller 12 and the second raised feature 22 on the outer roller 14 during roll forming. It has been determined that the configuration of the first side surface 114 is significantly affected by the relative size of the contact width 84a (see FIG. 1E) between projection 84 of inner roller 12 and the inner surface 92 of the pipe element 94, and the contact width 40a (see FIG. 1A) between the projection 40 on the outer roller 14 and the outer surface 100 of the pipe element. Specifically, it is found that making the contact width 84a of projection 84 on inner roller 12 narrower than the contact width 40a of projection 40 on outer roller 14 forms side surface 114 so that it projects radially outwardly beyond the outer surface 100 of the pipe element 94 in its entirety as desired. The projecting side surface 114 significantly improves the performance of the pipe element with respect to pressure capability and bending stiffness and strength when mechanical couplings are used to join pipe elements having projecting side surfaces 114 as shown in FIG. 8. Tests have shown a factor of three improvement in maximum pressure to failure and significant improvement is expected in bending capability as well. The effects are manifest for pipe elements having a thin sidewall 112, for example up to about 0.079 inches (2 mm). Similar improvement in performance is also expected for pipe elements having sidewall thicknesses as great as ½ to ¾ inches. FIG. 8 also shows pipe element 94 having a conically tapered end 110 formed using the outer roller 14 shown in FIG. 1. The advantages to tapering the pipe end 110 are that flare is eliminated and the outer diameter of the pipe element is controllable to a much smaller tolerance than the normal manufacturing tolerances. The tapered end serves as a lead in during assembly, and promotes insertion by exerting a prying force to separate the coupling segments.

FIG. 9 shows a pipe element 94 having an end 110 and comprising a sidewall 112 between outer surface 100 and inner surface 92. A circumferential groove 108 is positioned in the outer surface 100 and comprises a first side surface 114 proximate to end 110, a floor surface 116 contiguous with the first side surface 114, and a second side surface 118 contiguous with the floor surface 116 and in spaced relation to the first side surface 114. In this example pipe element the first and second side surfaces 114 and 118 are oriented substantially perpendicularly to the axis 96 and the floor surface 116 is oriented substantially parallel thereto. FIG. 9 also shows pipe element 94 having a burnished surface 120 positioned between the groove 108 and the end 110 of the pipe element. In this example pipe element the burnished surface 120 is oriented substantially parallel to the axis 96 and is positioned in spaced relation away from the end 110 of the pipe element 94. The advantage to including a burnished surface region on the pipe element is that it provides a sealing surface, i.e., a smooth surface to accept a seal. This ensures that a fluid tight joint is created when the pipe elements are joined by a mechanical coupling as described below. It is advantageous to control the diameter 121 of the burnished surface 120. In one example, the tolerance on the diameter 121 may be substantially equal to the tolerance on the diameter 119 of the groove floor surface 116. In another example, the tolerance on the diameter 121 of the burnished surface 120 may be from about 20% to about 50% of the tolerance on the pipe element diameter 123, the actual tolerance varying as a function of the size of the pipe element.

Figure 10:
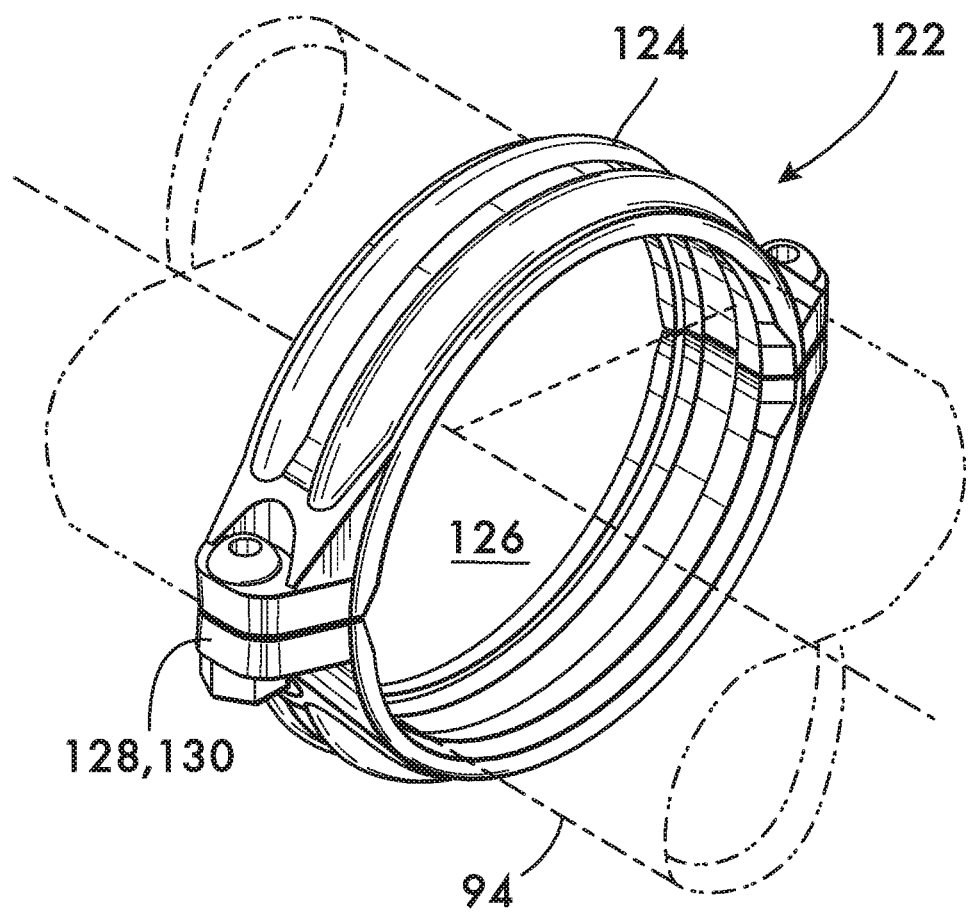
FIG. 10 is an isometric view of an example combination of pipe elements and a coupling according to the invention.
Figure 11:
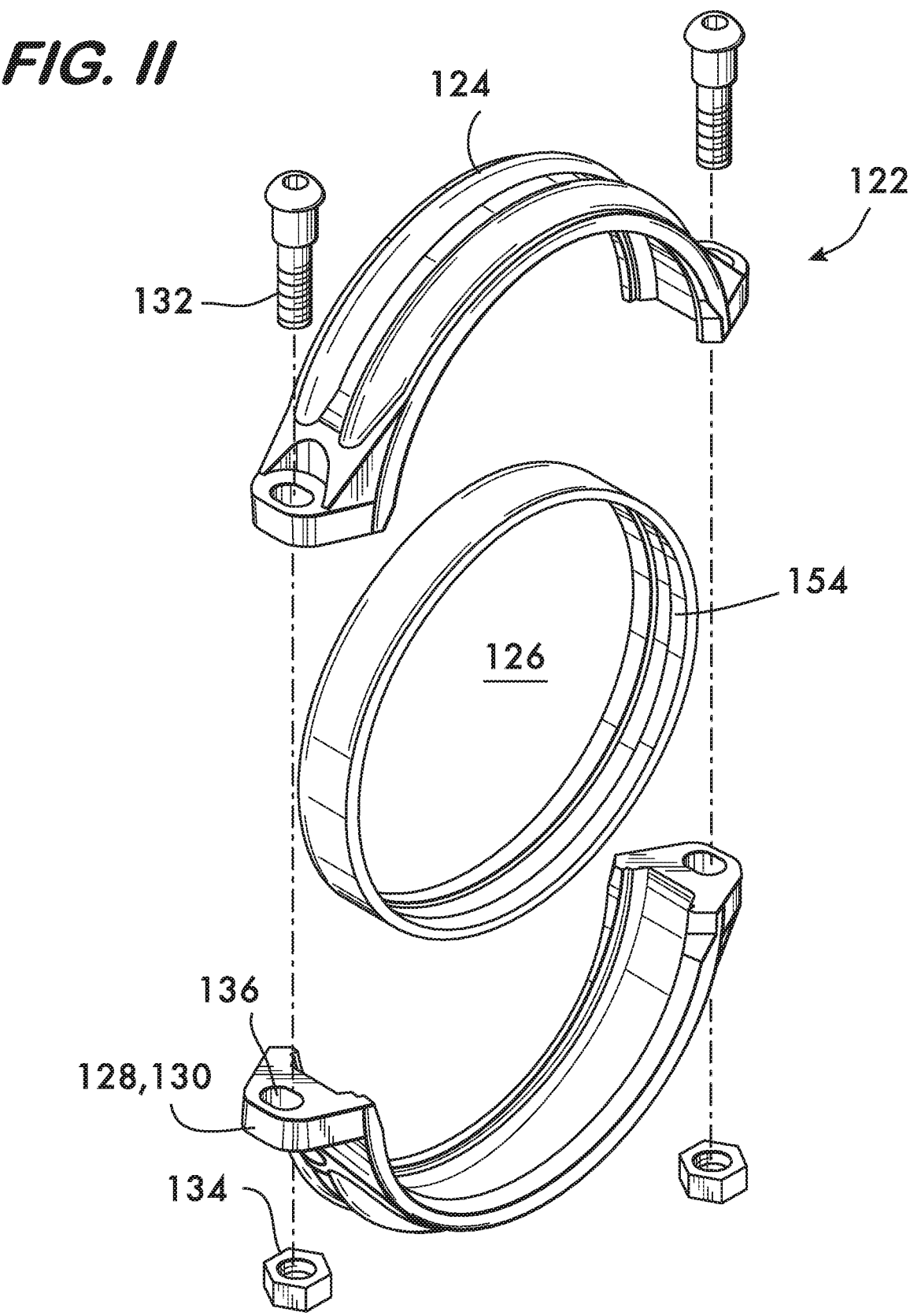
FIG. 11 is an exploded isometric view of an example coupling.

FIGS. 10 and 11 illustrate, in combination, pipe elements 94 joined end to end via a mechanical coupling 122. Coupling 122 comprises a plurality of segments 124, in this example two segments, attached end to end and surrounding a central space 126. Connection members 128, in this example comprising projections 130, are positioned on opposite ends of each segment 124. The connection members effect a connection between the segments and are adjustably tightenable to draw the segments toward one another. In this example adjustable tightening is effected by bolts 132 and nuts 134 that are received within aligned holes 136 in each projection 130.

Figure 12:
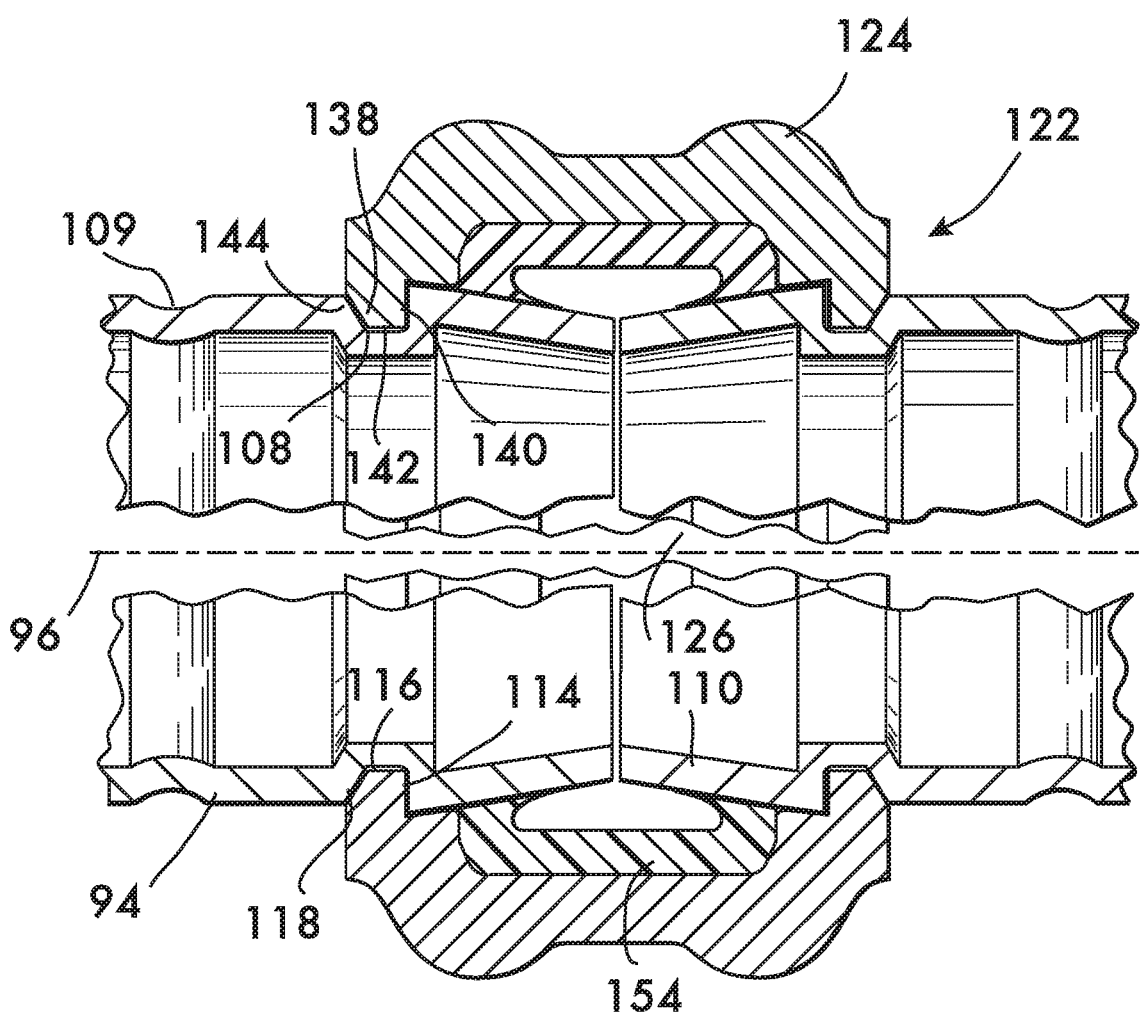
FIGS. 12 and 13 are longitudinal sectional views of example combinations of pipe elements and a coupling according to the invention.

As shown in FIG. 12, each segment 124 further comprises at least one key 138. Keys 138 project toward the central space 126 and each key engages a groove 108 in pipe elements 94. FIG. 12 shows an example combination of coupling 122 and pipe elements 94 joined in end to end relation wherein the keys 138 each comprise a first key surface 140 engaged with the first side surface 114 of groove 108; a second key surface 142, contiguous with the first key surface and facing the floor surface 116 of the groove 108, and a third key surface 144, contiguous with the second key surface and engaged with the second side surface 118 of groove 108. In the example combination of FIG. 12, the key surfaces 140, 142 and 144 have the same orientation as the corresponding surfaces 114, 116 and 118 that they engage. Thus the first key surface 140 and the first side surface 114 are oriented substantially perpendicularly with respect to the longitudinal axis 96 of the pipe elements 94, the second key surface 142 and the floor surface 116 are substantially parallel to the axis 96, and the third key surface 144 and the second side surface 118 are oriented angularly with respect to axis 96. FIG. 12 also shows an example combination embodiment wherein the first side surface 114 projects radially outwardly beyond the outer surface 100 of the pipe element 94 in its entirety, as would be formed by the roller set 10 shown in FIG. 1. This is a high performance joint for pressure and bending moment loading by virtue of the radially projecting first side surface 114 of the groove 108. FIG. 12 also shows a conically tapered end 110 of pipe element 94, wherein flare was eliminated and the pipe element diameter at the end is controlled to a tighter tolerance than provided during manufacture of the pipe element.

Figure 13:
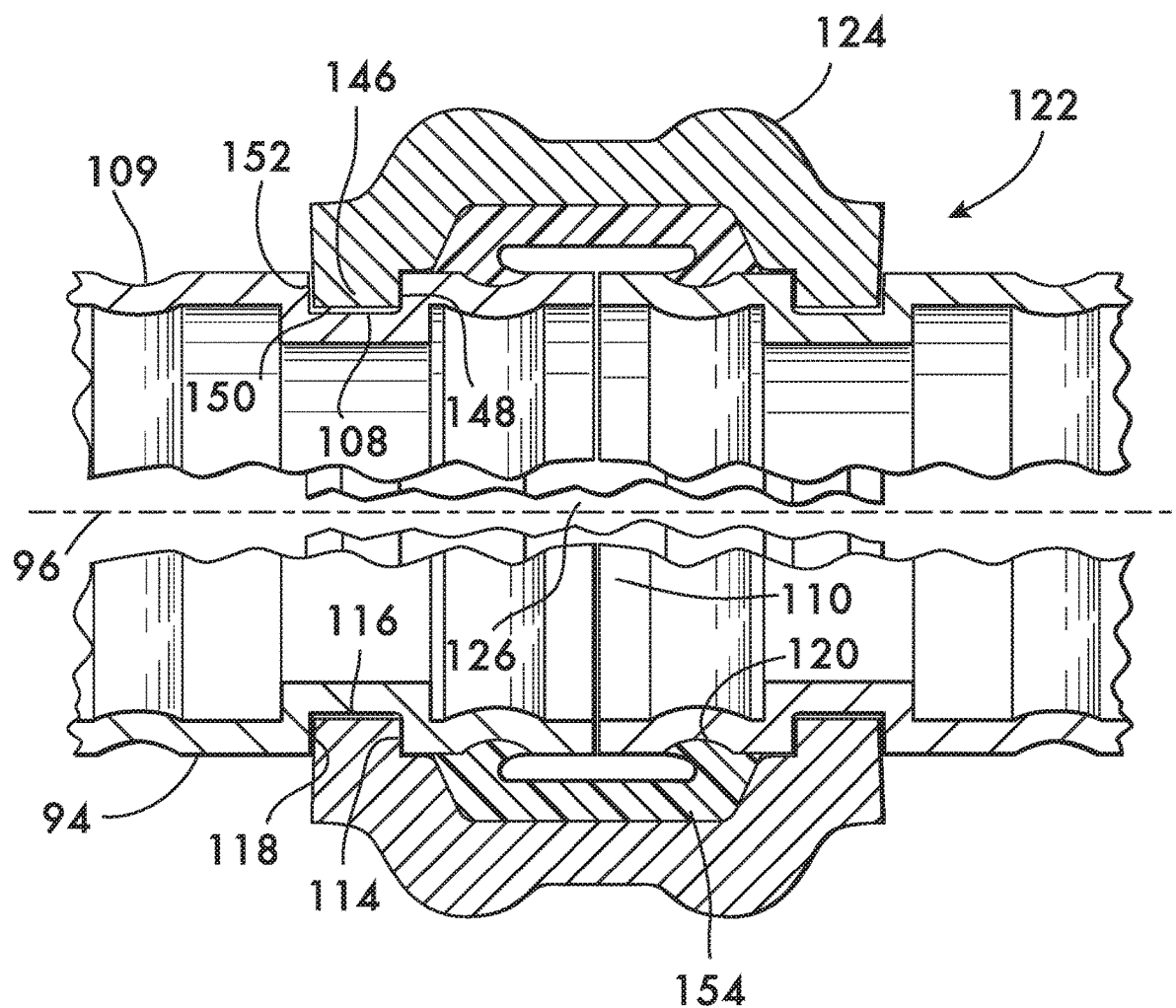

In the example combination shown in FIG. 13, each segment 124 again comprises at least one key 146. Keys 146 project toward the central space 126 and each key engages a groove 108 in pipe elements 94. FIG. 13 shows an example combination of coupling 122 and pipe elements 94 joined in end to end relation wherein the keys 146 each comprise a first key surface 148 engaged with the first side surface 114 of groove 108; a second key surface 150, contiguous with the first key surface and facing the floor surface 116 of the groove 108, and a third key surface 152, contiguous with the second key surface and facing the second side surface 118 of groove 108. In the example combination of FIG. 13, the key surfaces 148, 150 and 152 have the same orientation as the corresponding surfaces 114, 116 and 118 that they engage or face. Thus the first key surface 148 and the first side surface 114 are oriented substantially perpendicularly with respect to the longitudinal axis 96 of the pipe elements 94, the second key surface 150 and the floor surface 116 are substantially parallel to the axis 96, and the third key surface 152 and the second side surface 118 are also oriented substantially perpendicularly with respect to axis 96. FIG. 13 also shows a burnished surface 120 positioned between the groove 108 and the end 110 of pipe element 94. In this example pipe element the burnished surface 120 is oriented substantially parallel to the axis 96 and is positioned in spaced relation away from the end 110 of the pipe element 94. The advantage to including a burnished surface region on the pipe element is that it provides a smooth surface to accept the sealing surface of a gasket 154 (see also FIG. 11) captured between the segments 124 and the pipe elements 94. This ensures that a fluid tight joint is created when the segments 124 are drawn toward one another by bolts 132 to compress the gasket 154 and engage the keys 138 with the grooves 108 in the pipe elements 94 (see FIG. 10). It is understood that the example combinations of couplings and pipe elements according to the invention could have any combination of the features shown in FIGS. 12 and 13.

What is claimed is:

1. A method for forming a region of a pipe element using a roller set for forming regions of a pipe element having an inner and an outer surface, said roller set comprising:
an inner roller engageable with said inner surface, said inner roller comprising an inner roller body, a flange extending circumferentially around said inner roller body;
an outer roller engageable with said outer surface, said outer roller comprising:
an outer roller body rotatable about a first axis, said inner roller body being rotatable about a second axis, said flange projecting transversely to said second axis and being engageable with an end of said pipe element;
a first raised feature comprising a first summit, engageable with said pipe element and extending circumferentially about said outer roller body and projecting radially from said first axis;
a second raised feature comprising a second summit, engageable with said pipe element and extending circumferentially about said outer roller body and projecting radially from said first axis, said second raised feature being positioned adjacent to said first raised feature;
a third raised feature comprising a third summit, engageable with said pipe element and extending circumferentially about said outer roller body and projecting radially from said first axis, said second raised feature being positioned between said first and third raised features; wherein
said first and third summits are arranged in spaced relation away from said second summit;
said second raised feature of said outer roller comprises a first projection extending circumferentially around said outer roller body and projecting radially from said first axis, said first projection having a first contact width over which it contacts said outer surface of said pipe element during roll forming, said roller set further comprising a second projection extending circumferentially around said inner roller and projecting radially from a second axis arranged coaxially with said inner roller, said second projection having a second contact width over which it contacts said inner surface of said pipe element during roll forming, said method comprising:
positioning said inner surface of said pipe element on said inner roller with said inner surface contacting said second contact width of said second projection;
moving said first contact width of said first projection into contact with said outer surface of said pipe element, said first and second axes being substantially parallel with one another;
rotating said inner roller, thereby rotating said pipe element and said outer roller;
while rotating said rollers and said pipe element, forcing said inner and outer rollers toward one another to deform said pipe element between said first and second projections.

2. A method for forming a region of a pipe element using the roller set according to claim 1, wherein said second raised feature comprises a ring surrounding said outer roller body, said ring being rotatable about said first axis relatively to said outer roller body.

3. A method for forming a region of a pipe element using the roller set according to claim 2, further comprising a plurality of bearings positioned between said ring and said outer roller body.

4. A method for forming a region of a pipe element using the roller set according to claim 1, wherein said inner roller comprises:
a first depression extending circumferentially around said inner roller body and positioned adjacent to said flange;
a second depression extending circumferentially around said inner roller body and positioned adjacent to said first depression; wherein
when said inner and outer rollers cooperate to form said region of said pipe element said first and second raised features align respectively with said first and second depressions.

5. A method for forming a region of a pipe element using the roller set according to claim 4, further comprising a third depression extending circumferentially around said inner roller body and positioned adjacent to said second depression, and wherein when said inner and outer rollers cooperate to form said region of said pipe element said first, second and third raised features align respectively with said first, second and third depressions.

6. A method for forming a region of a pipe element using the roller set according to claim 5, said method comprising:
positioning said inner surface of said pipe element on said inner roller;
moving said second raised feature of said outer roller into contact with said outer surface of said pipe element, said first, second and third raised features aligning respectively with said first, second and third depressions;
rotating said inner roller, thereby rotating said pipe element and said outer roller;
while rotating said rollers and said pipe element, forcing said inner and outer rollers toward one another to deform said pipe element between said second raised feature and said second depression;
upon continued movement of said inner and outer rollers toward one another, contacting said pipe element with said first raised feature and said third raised feature.

7. The method according to claim 6, further comprising positioning an end of said pipe element in contact with said flange positioned on said inner roller.

8. The method according to claim 6, further comprising moving said second raised feature of said outer roller into contact with said outer surface of said pipe element with said first and second axes being substantially parallel with one another.

9. The method according to claim 6, comprising rotating said inner roller before moving said second raised feature of said outer roller into contact with said outer surface of said pipe element.

10. The method according to claim 6, wherein said first raised feature contacts said pipe element before said third raised feature.

11. The method according to claim 6, wherein said third raised feature contacts said pipe element before said first raised feature.

12. The method according to claim 6, wherein said first and third raised features contact said pipe element substantially simultaneously.

13. The method according to claim 6, wherein said first raised feature contacts said pipe element at an end thereof.

14. The method according to claim 6, wherein said first raised feature contacts said pipe element over a region in spaced relation to an end thereof.

15. The method according to claim 6, further comprising angularly orienting a longitudinal axis of said pipe element with a longitudinal axis of said inner roller.

16. The method according to claim 15, comprising orienting said longitudinal axis of said pipe element at an orientation angle with respect to said longitudinal axis of said inner roller from about 1° to about 3°.

17. The method according to claim 1, comprising contacting said inner surface of said pipe element with said second contact width wherein said second contact width is narrower than said first contact width.

* * * * *